US011386789B1

(12) United States Patent
Bajaj et al.

(10) Patent No.: US 11,386,789 B1
(45) Date of Patent: Jul. 12, 2022

(54) USING A PREDICTIVE REQUEST MODEL TO OPTIMIZE PROVIDER RESOURCES

(71) Applicant: Lyft, Inc., San Francisco, CA (US)

(72) Inventors: Saurabh Bajaj, San Francisco, CA (US); Davide Crapis, Berkeley, CA (US); Eran Davidov, San Francisco, CA (US); Omar Khalid, Redmond, WA (US); Ehud Milo, San Mateo, CA (US)

(73) Assignee: Lyft, Inc., San Francisco, CA (US)

( * ) Notice: Subject to any disclaimer, the term of this patent is extended or adjusted under 35 U.S.C. 154(b) by 493 days.

(21) Appl. No.: 15/809,618

(22) Filed: Nov. 10, 2017

(51) Int. Cl.
| | |
|---|---|
| *G06F 19/00* | (2018.01) |
| *G06G 7/70* | (2006.01) |
| *G06G 7/76* | (2006.01) |
| *G08G 1/00* | (2006.01) |
| *G01C 21/34* | (2006.01) |
| *G06Q 50/30* | (2012.01) |
| *G08G 1/123* | (2006.01) |
| *H04W 4/30* | (2018.01) |

(52) U.S. Cl.
CPC ......... *G08G 1/202* (2013.01); *G01C 21/3438* (2013.01); *G06Q 50/30* (2013.01); *G08G 1/123* (2013.01); *G08G 1/205* (2013.01); *H04W 4/30* (2018.02)

(58) Field of Classification Search
CPC ........ G08G 1/202; G08G 1/123; G08G 1/205; H04W 4/30; H04W 4/021; G01C 21/3438; G06Q 50/30; G06Q 30/0605; G06N 7/005; G06N 7/00; G06N 99/00; G06F 17/3053

USPC ......................................... 701/117; 705/26.2
See application file for complete search history.

(56) References Cited

U.S. PATENT DOCUMENTS

| | | | |
|---|---|---|---|
| 2013/0246207 A1* | 9/2013 | Novak | G06Q 30/0283 705/26.2 |
| 2017/0024393 A1* | 1/2017 | Choksi | G06F 16/24578 |
| 2017/0192437 A1* | 7/2017 | Bier | G01C 21/28 |
| 2018/0101925 A1* | 4/2018 | Brinig | H04W 4/021 |
| 2018/0189669 A1* | 7/2018 | Jeon | G06Q 10/047 |
| 2018/0232840 A1* | 8/2018 | Liu | G06F 7/08 |
| 2018/0315088 A1* | 11/2018 | Bijor | G06Q 30/0269 |

OTHER PUBLICATIONS

IP.com Search—Feb. 25, 2021 (Year: 2021).*

* cited by examiner

*Primary Examiner* — Mahmoud S Ismail
(74) *Attorney, Agent, or Firm* — Keller Preece PLLC

(57) ABSTRACT

The present application discloses an improved transportation matching system, and corresponding methods and computer-readable media. According to disclosed embodiments, a transportation matching system trains a predictive request model to generate a metric predicted to trigger an increase in transportation provider activity within the geographic area for a given time period. Furthermore, the system determines a predicted gap between expected request activity and expected transportation provider activity for the geographic area during a future time period, utilizes the predictive request model and the predicted gap to generate a metric for the geographic area, and generates an interactive map associated with a customized schedule for the geographic area and the future time period based on the generated metric.

20 Claims, 9 Drawing Sheets

USING A PREDICTIVE REQUEST MODEL TO OPTIMIZE PROVIDER RESOURCES

BACKGROUND

The popularity and utilization of mobile app-based transportation matching systems has grown significantly in recent years. Through such a transportation matching system, a requestor utilizes a requestor computing device to generate and send a transportation request including a pickup location and destination location. The system then matches the transportation request to a transportation provider device associated with a provider, after which the provider transports the requestor to the destination location. Given their growing popularity, a transportation system might receive hundreds if not thousands of transportation requests for a single geographic area within a relatively short time period. Furthermore, a transportation matching system might manage a network of hundreds of thousands of provider computing devices as well as millions of requestor computing devices. This causes a number of technical complexities when it comes to managing and processing such large volumes of transportation requests.

To illustrate, for a given geographic area, it is common for the number of received transportation requests to exceed the number of available provider computing devices. Accordingly, the transportation matching system is unable many times to match a received transportation request to a provider computing device within the geographic area. This is further complicated by the fact that the volume of received transportation requests varies greatly, even within a single geographic area. As a result, conventional transportation matching systems are often incapable of controlling the locations of provider computing devices to ensure the number of available provider computing devices within an area is sufficient to match the received transportation requests for the area. Moreover, conventional transportation systems lead to delayed transportation request processing times, failed transportation requests, and inefficient system and device management.

Accordingly, a need exists for a transportation matching system capable of more effectively and efficiently matching received transportation requests within a given geographic area.

BRIEF SUMMARY OF THE INVENTION

Not Applicable.

BRIEF DESCRIPTION OF THE DRAWINGS

The detailed description refers to the drawings briefly described below.

DETAILED DESCRIPTION

This application discloses various embodiments of a transportation matching system, computer readable media, and corresponding methods that provide benefits and/or solve the foregoing problems in the art. In accordance with one or more embodiments, a transportation matching system trains and then utilizes a predictive request model to customize provider schedules for transportation providers. Indeed, in one or more embodiments, the disclosed system accesses a training dataset comprising historical information for past transportation requests and transportation provider activity for a plurality of geographic areas and a plurality of past time periods. Using the training dataset, the system trains a predictive request model to generate incentive metrics predicted to trigger required levels of transportation provider activity based on geographic area and time. The system can then utilize the generated incentive metric to trigger the level of transportation provider activity necessary to satisfy a predicted gap between transportation requests and transportation provider activity for a given geographic area and a given future time period. Indeed, the system utilizes the incentive metric and the predicted gap to generate a customized provider schedule to be sent to one or more transportation provider devices. In this manner, the system ensures an adequate amount of transportation provider activity for the given geographic area and the given future time period.

To illustrate, in one or more embodiments, the system predicts, based on historical information, an amount of request activity and an amount of transportation provider activity for a given geographic area during a given future time period. Based on the predicted request activity and predicted transportation provider activity, the system determines whether there will be a predicted gap between the request activity and transportation provider activity (e.g., determines that the predicted transportation provider activity will be insufficient to cover the predicted number/frequency of requests). The system then utilizes the predictive request model to generate an incentive metric representing the predicted incentive/action necessary to trigger an increase in transportation provider activity sufficient to cover the predicted gap. Moreover, the system then tracks actual activity within the geographic area for the time period to determine the results of the generated incentive metric, and then further trains the predictive request model based on the tracked results.

Figure 1:
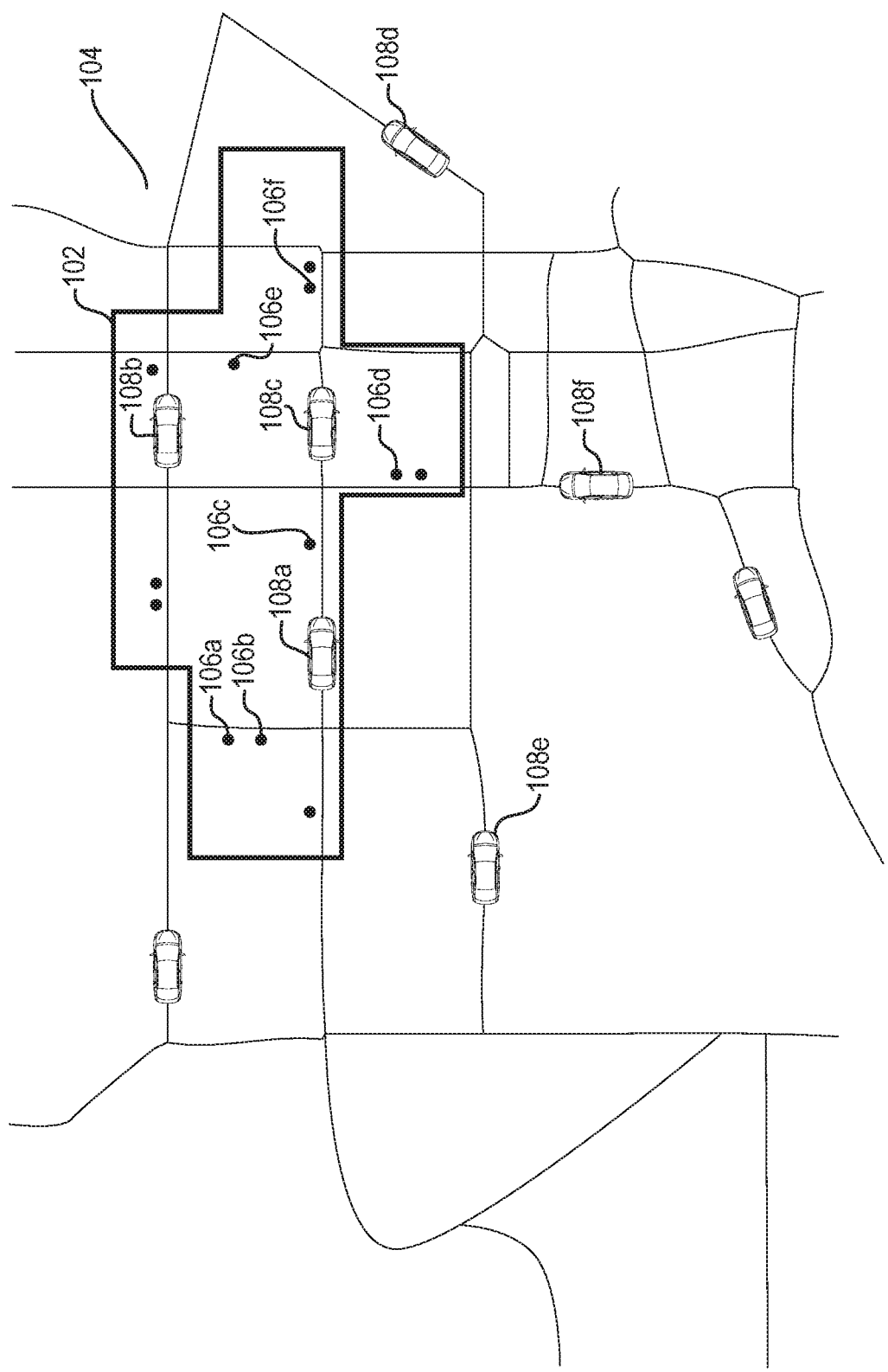
FIG. 1 illustrates an example embodiment illustrating one or more problems solved by the transportation matching system in accordance with one or more embodiments.

To illustrate the problems solved by the systems and methods described herein, FIG. 1 shows a geographic area 102 in a region 104 during a particular time on a particular day. For example, in one or more embodiments, the geographic area 102 can be a predefined neighborhood, a borough, or the area within a zip code. In some embodiments, the geographic area 102 is manually defined. Alternatively, a transportation matching system can automatically define the geographic area 102 based on population, traffic volume, or request volume.

In additionally embodiments, the transportation matching system can define the geographic area 102 in other ways. For example, in one or more embodiments, the transportation matching system can track transportation matching history to identify, track, and otherwise segment the region 104 into one or more geographic areas. In one or more embodiments, the transportation matching system can segment the geographic area 102 based on a statistical analysis of transportation requests. The transportation matching system can define the geographic area 102 based on request density, streets, sides of streets, and/or uniform sizes or shapes. Furthermore, in at least one embodiment, the transportation matching system can combine multiple geographic areas in order to create the geographic area 102. Additionally, the transportation matching system can redefine the shape and size of the geographic area 102 into a smaller or larger area based on ongoing analysis of request density, transportation matching history, and other event information.

As shown in FIG. 1, within the geographic area 102 on the particular time and day, there are a number of requestor computing devices 106a-106f (e.g., mobile devices running a transportation matching mobile application and/or used by requestors to submit transportation requests to a transportation matching system). In response to receiving transportation requests from the requestor computing devices 106a-106f, a transportation matching system attempts to match the requests to one of the provider computing devices 108a-108c (e.g., mobile devices of transportation providers) within the geographic area 102. For example, the transportation matching system can match a request to a provider computing device based on how close the provider is to the requestor, based on a destination of the request, based on one or more preferences of the user submitting the request, based on one or more characteristics of a vehicle of the provider, based on one or more ratings of the provider, etc.

However, as shown in FIG. 1, there are insufficient provider computing devices 108a-108c within the geographic area 102 to match to received requests from all of the requestor computing devices 106a-106f. For example, if the transportation matching system matches each provider computing devices 108a-108c to one of the requestor computing devices 106a-106f, there will be several remaining requestor computing devices 106a-106f left without timely access to transportation services. This disparity between request activity and transportation provider activity can lead to multiple undesirable outcomes. For instance, requestors may be left out in bad weather or unsafe conditions while waiting for transportation, requestors may become frustrated and try a different transportation service, requestors may cancel and submit repeated requests resulting in unnecessary traffic for the transportation system, or reduced matching metrics (e.g., matching percentage, estimated arrival time of providers).

In some embodiments, providers outside the geographic area 102 but within the region 104 may be idle and miss out on an opportunity to be matched to a request. For example, as illustrated in FIG. 1, there are a number of provider computing devices 108a-108c located outside the geographic area 102 on the particular time and day. Due to a variety of considerations (e.g., the distance between the provider computing devices 108a-108c and the requestor computing devices 106a-106f, preferences associated with provider computing devices 108a-108c), the transportation matching system might not match the requests from the requestor computing devices 106a-106f to the provider computing devices 108a-108c. Thus, the transportation matching system was unable to manage transportation provider activity levels within the geographic area 102 to satisfy the received requests from the requestor computing devices 106a-106f.

Accordingly, the present transportation matching system solves these and other problems by predicting where gaps will occur between request activity (e.g., a number of received requests) and transportation provider activity (e.g., number of providers or provider hours) for a given geographic area and period of time, and then triggering increases of transportation provider activity to cover the predicted gaps. In one or more embodiments, the transportation matching system predicts a gap for the geographic area 102 by first tracking request information over time in association with the geographic area 102. For instance, in some embodiments, the transportation matching system tracks a number of requests received during each incremental time period (e.g., each hour) in the past, the geographic locations where the requests originate, the destinations specified in each request, and other information associated with each requestor computing device 106a-106f.

Similarly, the transportation matching system tracks provider information over time in association with the geographic area 102. For example, the transportation matching system tracks a number of provider computing devices located within the geographic area 102 during each incremental time period in the past, an amount of time a given provider computing device remains within the geographic area 102 before being matched to a request (e.g., idle time), an amount of time a given provider computing device remains within the geographic area 102 before leaving the geographic area 102 without being matched to a request, etc. From this tracked information, the transportation matching system can determine a predicted average number of providers or provider hours that will be available within the geographic area 102 during any time period in the future.

In order to identify a gap between expected requests and predicted provider hours available in the geographic area 102, the transportation matching system can convert the expected requests to an hourly average. In one or more embodiments, the transportation matching system assigns an average transportation time to each request received for a given hour associated with the geographic area 102. To illustrate, if the transportation matching system predicts that thirty requests will be received within the geographic area 102 on a Monday in between 8 am and 9 am, the transportation matching system can average transportation times associated with previous requests received on Mondays during that time. If the average transportation time is twenty minutes (including expected idle time between matched requests), the transportation matching system can determine that ten provider hours will be needed for that hour in order to satisfy the predicted number of requests. If the transportation matching system has previously predicted that only eight provider hours will be available in association with the geographic area 102 on Monday in between 8 am and 9 am, the transportation matching system determines that gap associated with the geographic area 102 for that period of time is two provider hours.

As mentioned above, in some embodiments, the transportation matching system identifies predicts gap associated with incremental time period (e.g., each hour) within the geographic area 102. In response to predicting one or more gaps associated with the geographic area 102 across a given week, for example, the present transportation matching system utilizes a predictive request model to optimize one or more incentives that the transportation matching system can offer to the provider computing devices 108a-108c. In one or more embodiments, the transportation matching system generates a customized incentive schedule such that it triggers an increase in provider activity (e.g., an increase in provider hours) within the geographic area 102 at a given time and day in order to fill a predicted gap. In one or more embodiments, the customized incentive schedule triggers an increase in provider activity while minimizing costs to the transportation matching system.

As mentioned, the transportation matching system utilizes a predictive request model to optimize an incentive to trigger increased provider activity in the most efficient way possible. For example, the transportation matching system can access a training dataset comprising historical information for past transportation provider activity. Specifically, the training dataset can indicate past incentives utilized by the transportation matching system to increase provider activity within a geographic area, and the success or failure of the past incentives. Using the training dataset, the transportation matching system trains a predictive request model to generate an incentive metric predicted to trigger an increase in transportation provider activity sufficient to cover a predicted gap between predicted request activity and predicted transportation provider activity. In some embodiments, the generated incentive metric represents a cost per additional provider hour and the predictive request model generates the incentive metric by generating a curve (e.g., a probability distribution) representing the relationship between the additional transportation provider activity needed (e.g., the additional provider hours needed) and a corresponding incentive metric predicted to trigger the additional activity. In some embodiments, the curve generated by the predictive request model reflects an exponential relationship between additional provider activity needed and the incentive metric required to trigger the additional provider hours.

As mentioned above, in one or more embodiments, the transportation matching system generates a customized incentive schedule for one or more provider computing devices. In at least one embodiment, the generated schedule outlines geographic metes and bounds of the geographic area 102, identifies the days and times associated with each predicted gap, and indicates the optimized incentive for each gap. In some embodiments, the transportation predicts the effectiveness of each potential incentive on a provider-by-provider basis, and optimizes selection of providers based on those most likely to increase activity within the target geographic area as a result of the incentive.

As such, the present transportation matching system provides a computer-based solution to an existing problem for conventional transportation services. Namely, the transportation matching system can determine an incentive that will motivate providers to be present in certain geographic areas at certain times in order to meet a predicted volume of requests. For example, by determining the motivating incentive, the transportation matching system better distributes provider resources across a geographic area in order to meet request activity. This leads to minimized provider downtime, as well as minimized requestor wait times. Accordingly, the transportation matching system results in an overall optimization in transportation services across a region, even though the total number of providers remains the same.

Furthermore, the transportation matching system optimizes provider incentive generation to minimize costs while still triggering the desired increase in provider activity. Additionally, the automatically generated incentive schedule provided by the transportation matching system offers "plug-and-play" usability where the one or more providers simply have to go where the customized incentive schedule dictates during the outlined times in order to earn the offered incentives.

As used herein, a "transportation request" (or "request") refers to a collection of data sent to a transportation matching system that, in turn, matches the request to at least one provider (e.g., a driver) who utilizes his or her personal vehicle to fulfill transportation requests. In one or more embodiments, a request includes the current location of the requestor computing device, a pickup location specified by the requestor computing device (e.g., if the pickup location is different from the current location), a pickup time specified by the requestor computing device (e.g., if the pickup time is different from the current time), a destination, and other preferences associated with the requestor computing device (e.g., a music preference, provider rating preference). The transportation matching system matches a transportation request to a particular provider computing device based on the provider computing device's current proximity to the requestor computing device where the request originated, as well as on other factors such as the destination specified in the request, driver ratings, and so forth.

As used herein, a "provider" refers to a provider of transportation services by way of the transportation matching system using his or her personal vehicle. In one or more embodiments, the transportation matching system matches a provider to a received request and provides instructions to the provider regarding when and where to go in order to fulfill the matched transportation request. In response to a provider completing a requested transport, the transportation matching system credits the provider based on, for example, the distance driven, the day and time, and any available incentives.

As used herein, a "provider hour" refers to an hour of time during which a provider is available to the transportation matching system. For example, during a provider hour, a provider may be driving or parked in an area waiting to be matched to a request. This is considered idle time within the provider hour. Further, during a provider hour, a provider may be actively driving a requestor to a specified destination. Additionally, if the specified destination is a suburban area where there are few requests, a provider hour can also include the time it takes the provider to drive back to a more heavily populated area (e.g., a city center).

As used herein, an "incentive" refers to an offer made by the transportation matching system that motivates one or more providers to give provider hours in a geographic area on a day and time. In one or more embodiments, an incentive motivates one or more providers to be physically present (e.g., driving or parked) within the geographic area on the day and time. When the one or more providers are incentivized to be within the geographic area on the day and time, the transportation matching system can match the provider's computing devices to one or more received requests.

As used here, the term "customized incentive schedule" refers to an electronic report indicating incentives available to the provider, as well as the locations and time periods the incentives are available. In some embodiments, customized incentive schedule includes a graphical representation of at least one geographic area and the incentive available for the geographic area. Moreover, customized incentive schedule can be customized for and specific to a particular driver. For instance, the level of incentives offered the geographic areas included may be customized for provider based on the areas where the provider is active and the success/failure of past incentives in triggering additional activity of the provider.

As used herein, the term "incentive metric" refers to a calculated measurement reflecting or providing the basis for an incentive (e.g., an incentive necessary to trigger additional provider activity). For example, in one or more embodiments, an incentive metric is a cost per additional provider hour. In yet further embodiments, an incentive metric is specific to a type of incentive (a percentage-based bonus, a fixed-amount guarantee, etc.). Moreover, an incentive metric can be derived from an incentive metric curve provider, for example, a relationship between the incentive metric and a predicted gap/deficit of provider activity.

As used herein, the term "predictive request model" refers to a machine learning model that can be tuned (e.g., trained) based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine-learning model can include but is not limited to, support vector machines, linear regression, logistic regression, Bayesian networks, clustering, K– nearest neighbors, K-means, random forest learning, dimensionality reduction algorithms, boosting algorithms, artificial neural networks, deep learning, etc. Thus, a machine-learning model makes high-level abstractions in data by generating data-driven predictions or decisions from the known input data.

Figure 2:
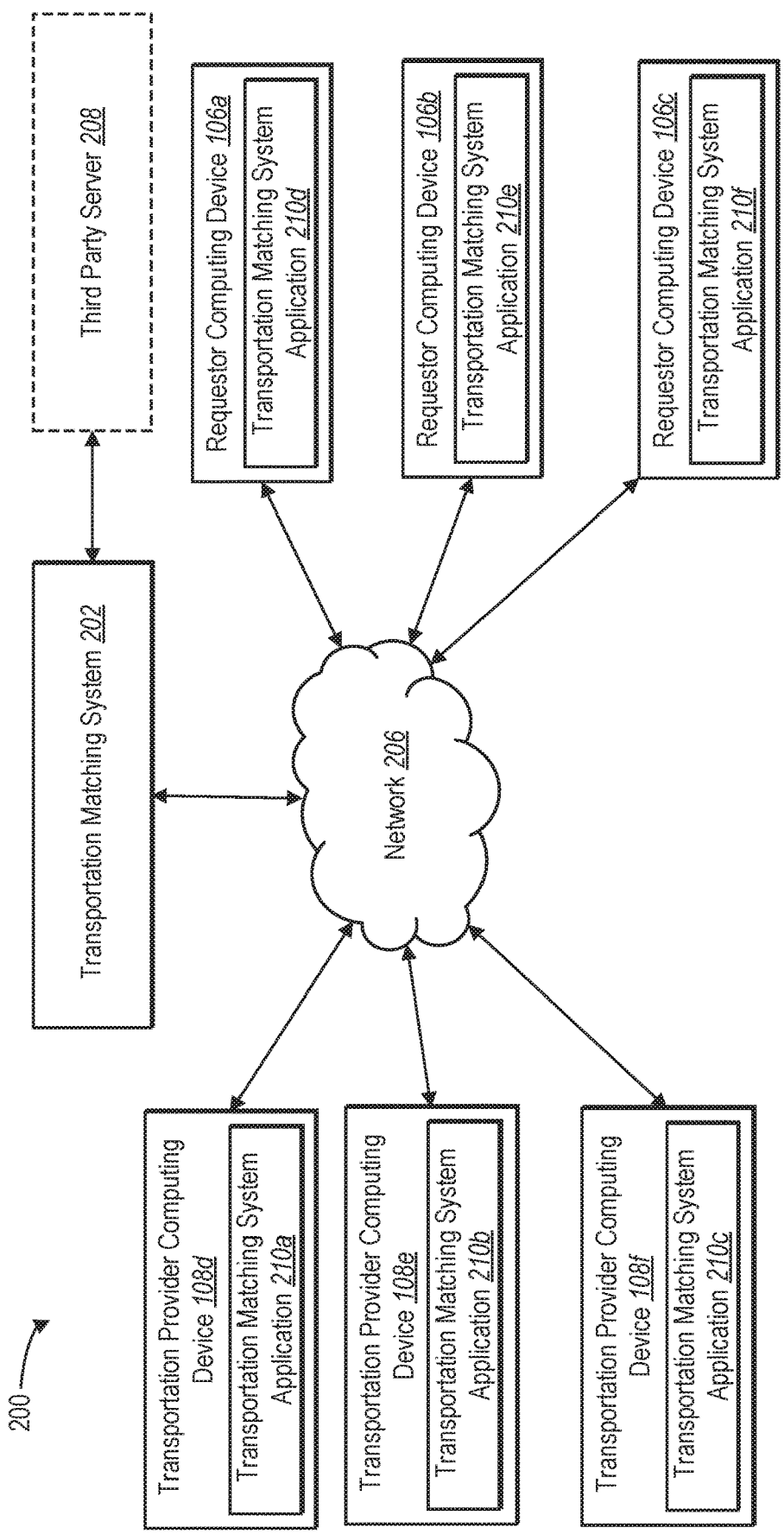
FIG. 2 illustrates an environmental diagram of the transportation matching system in accordance with one or more embodiments.

FIG. 2 illustrates an example environment 200 for the transportation matching system 202 including the requestor computing devices 106a, 106b, and 106c, the provider computing devices 108a, 108b, and 108c, and the transportation matching system 202 including the transportation matching system 202. As shown, in one or more embodiments, the transportation matching system 202 can be implemented on one or more server devices 204. As further shown in FIG. 2, the requestor computing devices 106a-106b and the provider computing devices 108a-108c communicate with the transportation matching system 202 via a network 206. In one or more embodiments, the network 206 may include one or more networks and may use one or more communication platforms or technologies suitable for transmitting data and/or communication signals. In one or more embodiments, the network 206 includes a cellular network. Alternatively, the network 206 can include the Internet or World Wide Web. Additionally or alternatively, the network 206 can include various other types of networks that use various communication technologies and protocols, such as a corporate intranet, a virtual private network ("VPN"), a local area network ("LAN"), a wireless local network ("WLAN"), a wide area network ("WAN"), a metropolitan area network ("MAN"), or a combination of two or more such networks.

In at least one embodiment, the requestor computing device 106a sends a request to the transportation matching system 202. As discussed above, a "request" refers to information provided by a transportation matching system application installed on the requestor computing device 106a and utilized by the transportation matching system 202 to match the request to a provider computing device that can fulfill the request. For example, the information that makes up a request can include, but is not limited to, a current location of the requestor computing device 106a, a specified pickup location (e.g., if different than the current location of the requestor computing device 106a), a current time associated with the requestor computing device 106a, a specific request time (e.g., if requesting a future transport), a specified destination location, a transportation matching system account identifier associated with the requestor computing device 106a, and other preferences associated with the requestor computing device 106a (e.g., highway vs. side-street preference, temperature preference, music preference, pet friendly preference, child seat preference, wheelchair accessible preference).

In one or more embodiments, the transportation matching system 202 receives a request from a transportation matching system application 210d (e.g., a mobile application for requestors) installed on the requestor computing device 106a and utilizes the information provided as part of the request to match the request to a provider computing device 108a. For example, the transportation matching system 202 matches a request to a provider computing device 108a based on: proximity of the provider computing device 108a to a specified pickup time and location, driver ratings and preferences, and the specified destination location in the request.

After identifying a match, the transportation matching system 202 requests a confirmation from the matched provider computing device 108a. For example, the transportation matching system 202 provides information to and receives confirmations from any of the provider computing devices 108a-108c via the transportation matching system applications 210a-210c (e.g., a mobile application for providers). In response to receiving a confirmation, the transportation matching system 202 provides a communication via the transportation matching system application 210d on the requestor computing device 106a stating that a provider (e.g., the provider computing device 108a) is coming to fulfill the request.

In one or more embodiments, the transportation matching system 202 utilizes third party information to predict request activity. Accordingly, as shown in FIG. 2, the environment 200 also includes the third party server 208. The third party server 208 can provide calendar information for upcoming events (e.g., sporting events, concerts, etc.) with corresponding expected demand associated with such events, weather information, and/or social networking system information. In at least one embodiment, the transportation matching system 202 utilizes information provided by the third party server 208, in combination with other information, to predict demand within a geographic area (e.g., geographic area 102) for future time periods.

For example, information from the third party server 208 can effect requestor activity in the geographic area 102 in various ways. For instance, a rainy weather in the geographic area 102 can cause an increase in requestor activity because fewer requestors will want to walk in the rain. Similarly, protests or civil unrest in the geographic area 102 can cause a decrease in requestor activity because fewer requestors will want to wait in the geographic area 102 for a pickup. Additionally, increased social media activity surrounding a particular event occurring in the geographic area 102 can lead to an increase in requestor activity because a higher number of requestors want to attend the event.

Over time, the transportation matching system 202 tracks request activity and provider activity in order to predict future request activity (e.g., number/frequency of requests for a given time period) and provider activity (e.g., number of providers or provider hours for a given time period). Using the predicted future activity, the transportation matching system 202 is able identify one or more gaps between, for example, an expected volume of requests and expected provider hours for given geographic areas at given days and times. For instance, the transportation matching system 202 can identify areas and times where expected request volume will exceed the available provider hours. In response to identifying these gaps, the transportation matching system 202 can utilize a predictive request model to generate an incentive metric necessary to trigger the additional provider activity needed to cover an expected gap.

Figure 3:
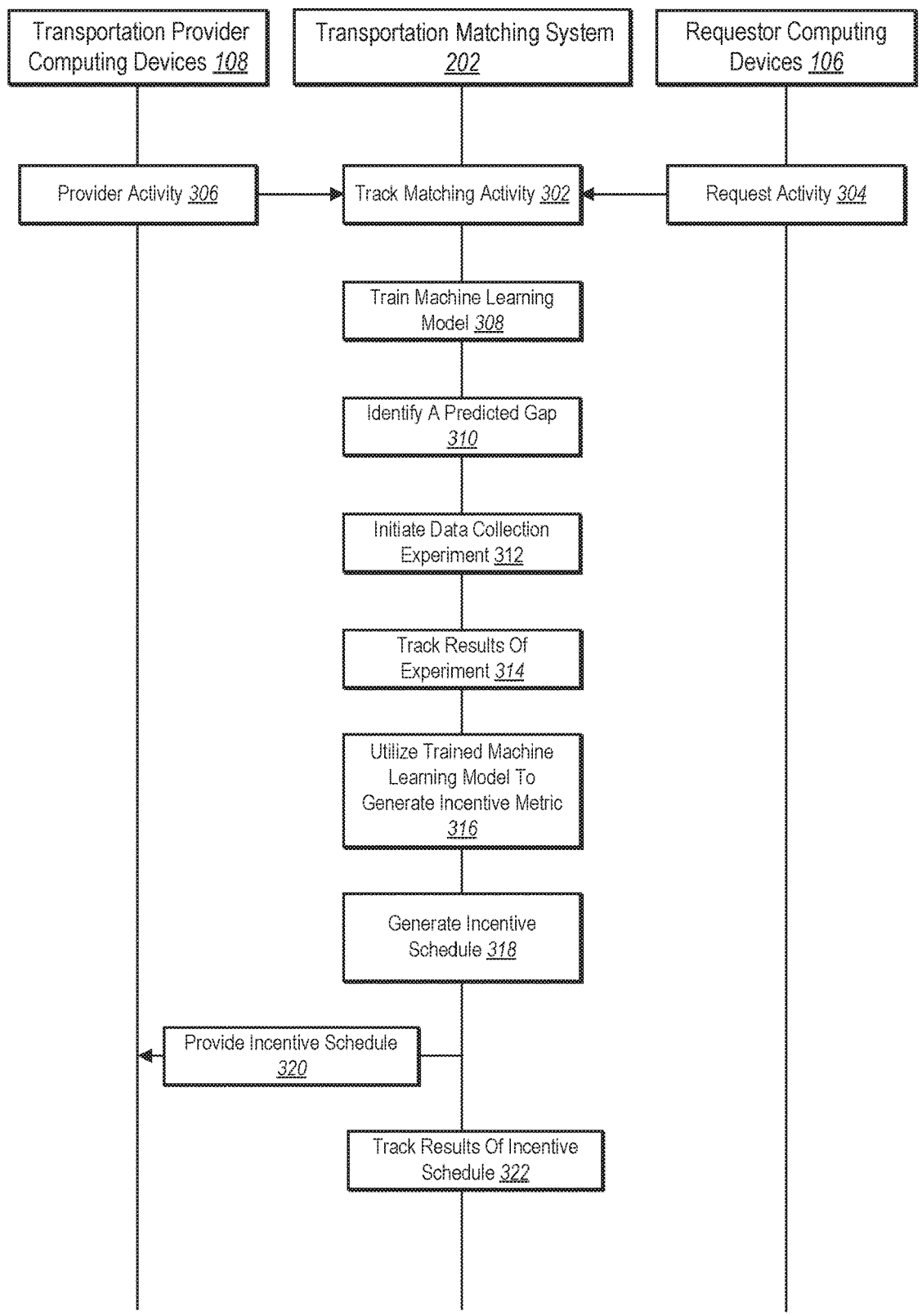
FIG. 3 illustrates a sequence diagram of a series of acts performed by the transportation system in accordance with one or more embodiments.

For example, FIG. 3 illustrates an example sequence of acts in accordance with the principles described herein. For instance, in accordance with the sequence of acts illustrated in FIG. 3, the transportation matching system 202 trains a predictive request model and then utilizes the predictive request model to generate incentive metrics for triggering additional provider activity to cover a predicted gap between request activity and provider activity for a given geographic area and time.

The process illustrated in FIG. 3 begins with the transportation matching system 202 tracking activity (302). For instance, the tracked activity includes request activity (304) associated with one or more requestor computing devices 106, and provider activity (306) associated with one or more provider computing devices 108. In one or more embodiments, requesting activity (304) includes information associated with requests received from requestor computing devices 106 within a given geographical area for a given period of time. For instance, in some embodiments, the transportation matching system 202 tracks a number of requests received during every hour of the week, the geographic locations where the requests originate, the destinations specified in each request, and other information associated with each request.

Similarly, in one or more embodiments, provider activity (306) includes information associated with the activity of providers (e.g., based on communications with provider computing devices 108), including information regarding times and locations of each provider's transportation activity, including provider hours within each geographic area. Additionally, the provider activity 306 includes information associated with incentives provided to each provider, the geographic areas and time periods associated with the incentives, and the results of the incentives (e.g., whether the incentive was successful in triggering additional provider activity for a given geographic area and time period). In at least one embodiment, the transportation matching system 202 tracks this activity for a predetermined period of time (e.g., one week, one month, six months) in order to build a repository of historical information for various geographic areas and time periods. Furthermore, in at least one embodiment, the transportation matching system 202 assigns weights to the historical information that, for example, correspond to the age and/or importance of the information. For example, the transportation matching system 202 can assign a heavier weight to information tracked recently than a weight assigned to information tracked further in the past.

When the transportation matching system 202 tracks or otherwise accesses sufficient historical information, the transportation matching system trains a predictive request model (308) using the information. For instance, the transportation matching system 202 trains the predictive request model to generate, for a given geographic area and time period, an incentive metric based on past information for the geographic area or similar areas and the time period or similar time periods. In at least one embodiment, the generated incentive metric represents a predicted incentive necessary to trigger an increase in transportation provider activity within the geographic area during the time period. For example, the incentive metric can represent a cost per additional provider, or the amount of incentive necessary to increase provider activity by one provider hour. In further embodiments, the incentive metric is derived from a computed curve representing the correlation between the number of additional provider hours needed (e.g., to cover a predicted gap for the geographic area during the time period), and a corresponding cost per hour to trigger that number of additional providers. Moreover, the transportation matching system 202 can train the predictive request model to generate an incentive metric that is specific to a given geographic area and time period, and that accounts for variations caused by time of year, weather, nearby events, traffic conditions, etc.

As indicated above, in one or more embodiments, the transportation matching system 202 identifies a predicted gap (310) for a geographic area during a future time period (e.g., a particular hour of the upcoming week). For example, as discussed above, a predicted gap might represent the difference between the expected level of request activity (e.g., a volume of requests) for a particular geographic area during a particular hour of the week, and the expected level of provider activity (e.g., a number of provider hours that will be available) in the particular geographic area during the particular hour of the week. As an over-simplified illustration, if the geographic area has experienced one hundred requests in the geographic area on the past several Mondays from 8 am to 9 am, the transportation matching system 202 might predict that on the next upcoming Monday from 8 am to 9 am, the geographic area will experience one hundred requests. Similarly, if the geographic area has averaged twenty-five provider hours on Mondays from 8 am to 9 am, the transportation matching system 202 might predict that on the next upcoming Monday from 8 am to 9 am, the geographic area will have twenty-five provider hours available.

As discussed above, in order to perform a direct comparison of requests to provider hours, the transportation matching system 202 converts the expected volume of requests to provider hours. For example, the transportation matching system 202 can assign an average transportation time, in provider hours, required for each transportation request. In one or more embodiments, the transportation matching system 202 determines the average transportation time for an expected request by analyzing historical information associated with the geographic area (e.g., to determine average ride distance/duration). In at least one embodiment, the transportation matching system 202 then multiplies the expected number of requests by the average provider hours (e.g., factoring in idle time) required to complete each request to determine the total provider hours required for the given geographic area and time period.

The transportation matching system 202 then identifies the predicted gap (310) by comparing the expected provider hours needed to the expected provider hours available for the given area and time period. If the expected provider hours available exceeds the expected provider hours needed, there is no predicted gap for that particular geographic area and time period. If the expected provider hours needed exceeds the expected provider hours available, the transportation matching system 202 identifies the difference as the predicted gap for the given geographic area and time period. In one or more embodiments, the transportation matching system 202 ignores predicted gaps below a certain threshold (e.g., less than 1 provider hour). Similarly, in one or more embodiments, the transportation matching system 202 only recognizes predicted gaps if there is a history of such gaps for the area and time period.

In one or more embodiments, in response to identifying the predicted gap for a given geographic area and time period, the transportation matching system 202 utilizes the trained predictive request model to generate an incentive metric, as discussed in more detail below. However, in some instances, the transportation matching system 202 recognizes that insufficient data is available to generate an accurate incentive metric for a given area and time period. In particular, the transportation matching system 202 might identify a deficit within the training dataset for a given area and time period. Accordingly, in one or more embodiments, the transportation matching system 202 initiates a data collection experiment (312) to correct the data deficit. For example, in at least one embodiment, the transportation matching system 202 designs an incentive experiment by providing randomized provider incentives to trigger increased provider activity within an area and then monitors the success or failure of each randomized incentive to trigger increased provider activity within the area for the given time period.

In one or more embodiments, the transportation matching system 202 can generate a variety of incentive types. For example, in at least one embodiment, the transportation matching system 202 offers one of four types of incentives. A first type of incentive is a volume incentive that offers a given amount for fulfilling a particular number of requests (e.g., "If you give one hundred rides, you will receive $200."). A second type of incentive is a weekly guarantee incentive that guarantees a minimum payment for fulfilling a specific number of requests (e.g., "If you give one hundred rides, you are guaranteed a minimum of $350."). A third type of incentive is a percentage bonus incentive (e.g., "You will receive a 20% bonus on all rides in Area A during time T."). A fourth type of incentive is an average hourly guarantee incentive that guarantees an average hourly payment (e.g., "If you drive between 6 pm and 8 pm and give at least one or two rides, you will receive at least $20 an hour.").

In one or more embodiments, the transportation matching system 202 randomizes the types of incentives and the amounts of each type of incentive provided during the experiment. For example, the transportation matching system 202 may initially include a percentage bonus incentive that includes 20% bonus for each request fulfilled during a given time period in a given area. If the transportation matching system 202 determines that an insufficient number of provider computing devices are responding to the 20% bonus incentive (e.g., the provider computing devices accept or reject the experimental schedule (314)), the transportation matching system 202 might increase the amount of the bonus to 30%. Further, the transportation matching system 202 can offer other types of incentives with increasing value over time. In one or more embodiments, the transportation matching system 202 may run the experiment multiple times for a given area and time period.

In order to generate training data based on the experiment (310), the transportation matching system 202 tracks the results of the experiment (314). For example, the transportation matching system 202 tracks the results of the experiment by tracking which incentives types and values resulted in the desired number of provider hours being given. In one or more embodiments, the transportation matching system 202 stores the tracked information until a repository of data has built up to a threshold amount. Additionally or alternatively, the transportation matching system 202 generates input vectors and corresponding outputs to supplement the training dataset and further train the predictive request model.

For example, in one or more embodiments, the transportation matching system 202 trains the predictive request model with data associated with each provider computing device included in the experiment. For instance, to train the predictive request model with data associated with a single provider computing device included in the experiment, the transportation matching system 202 first generates an input vector that includes the geographic area associated with the experiment, the day and time associated with the experiment, the incentive type that was offered to that provider computing device, the value of the incentive (e.g., 20% bonus on every fulfilled request) that was offered to the provider computing device, and the result (e.g., whether the incentive successfully triggered an increase in provider activity). The transportation matching system 202 then trains the predictive request model (e.g., via feed-forward back-propagation) with the input vector as an input into the predictive request model, and a number of provider hours given by the provider computing device during the experiment as a training output for the predictive request model. The transportation matching system 202 then repeats this process for each provider computing device included in the experiment. If, during the experiment, the transportation matching system 202 offered more than one incentive to a particular provider computing device before the provider computing device became available to fill the gap, the transportation matching system 202 can generate an input vector associated with each offered incentive and train the predictive request model with each generated vector as inputs and whether each offered incentive was accepted as outputs.

Once the predictive request model is trained, the transportation matching system 202 can utilize the predictive request model to generate an incentive metric (316) associated with a given geographic area for a future time period. The incentive metric can indicate a type of incentive and/or an incentive amount predicted to trigger the additional provider activity necessary to cover a predicted gap between request activity and provider activity for the area and time period.

In some embodiments, the incentive metric generally applies to all providers within a target group of providers. In additional or alternative embodiments, an incentive metric can be specific to a particular provider, and incentive metrics can vary from one provider to the next. In one or more embodiments, the transportation matching system 202 provides an input into the trained predictive request model including a number of additional provider hours needed, the geographic area, and the time period, and the predictive request model outputs the incentive metric for the area and time period predicted to trigger the desired increase in provider hours.

In one or more embodiments, the transportation matching system 202 can also stagger how incentive metrics are distributed to providers in order to trigger an even distribution of provider hours during a predicted gap. For example, if a predicted gap occurs between 8:00 pm and 10:00 pm on Friday within a geographic area, the transportation matching system 202 can distribute 25% of the generated incentive metrics at the beginning of the predicted gap (e.g., at 8:00 pm). Then the transportation matching system 202 can distribute another 25% of the generated incentive metrics every thirty minutes until the predicted gap closes. In at least one embodiment, this ensures that the predicted requestor activity during the gap is met with a sufficient number of provider hours.

Based on the generated incentive metric, the transportation matching system 202 can determine optimized incentives predicted to result in the desired increase in provider activity for a given geographic area and time period. For instance, the transportation matching system 202 can identify the types and values of incentives to provide, the providers to target with the incentives, and when to send the incentives in order to achieve the greatest increase in provider activity with the least cost. Furthermore, in some embodiments, the transportation matching system 202 groups target providers and customizes incentives for each group based on the characteristics of the group and the predicted effectiveness of the incentive.

Once the transportation matching system 202 generates an incentive metric and/or determines optimized incentives, the transportation matching system 202 generates a customized incentive schedule (318) including one or more optimized incentives and provides the customized incentive schedule to one or more provider computing devices (320). For example, the customized incentive schedule indicates the type and value of an incentive, a geographic area where the incentive is available, a time period when the incentive is available, and any other terms or conditions for qualifying for the incentive. In at least some embodiments, the customized incentive schedule includes a graphical representation illustrating the geographic area (e.g., a map of the geographic area).

Once the transportation matching system 202 distributes customized incentive schedules to provider computing devices 108, the transportation matching system 202 can then track the results of the customized incentive schedules (322) in the form of direct feedback from the providers (e.g., accepting or declining an incentive) and/or in the form of tracked transportation provider activity within the given geographic area during the given time period. Using the results, the transportation matching system 202 can then further train the predictive request model.

Figure 4B:
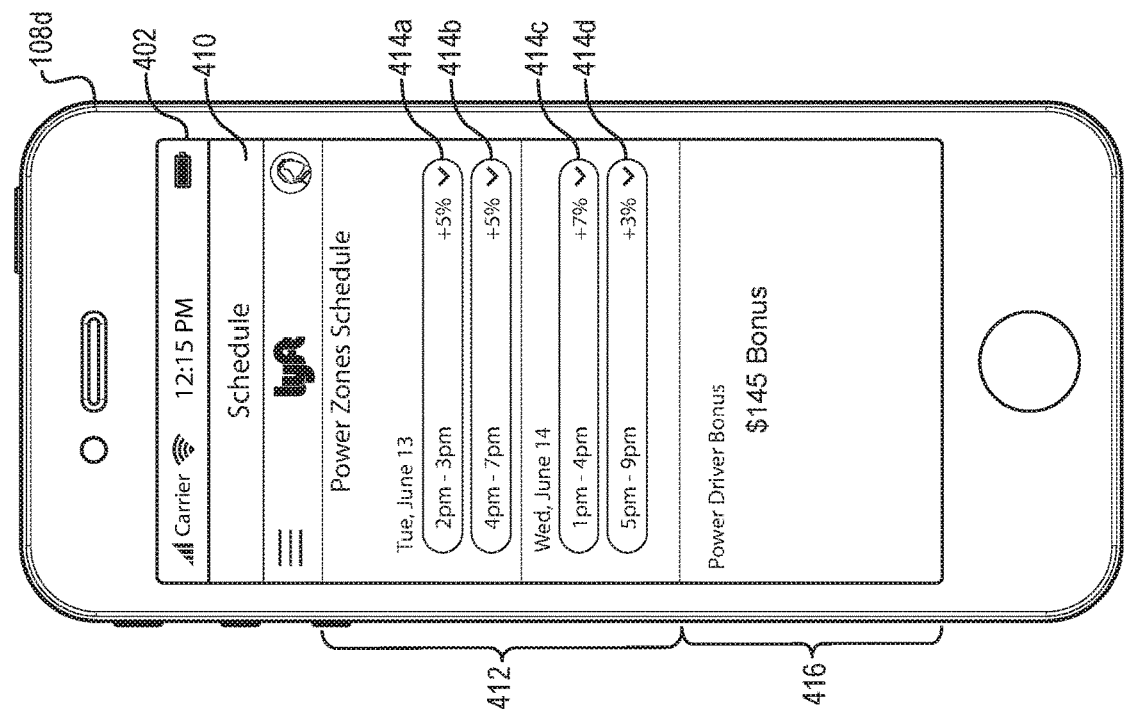
FIGS. 4A-4C illustrate a series of graphical user interfaces that the transportation matching system provides to one or more provider computing devices in accordance with one or more embodiments.
Figure 4A:
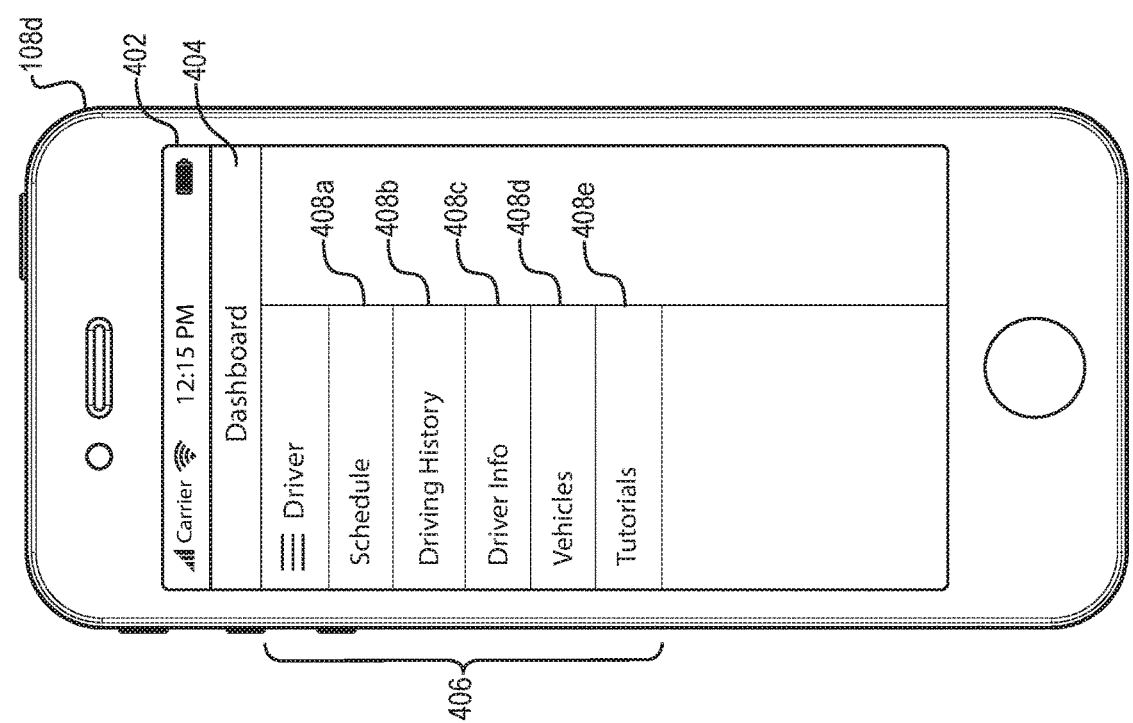
Figure 4C:
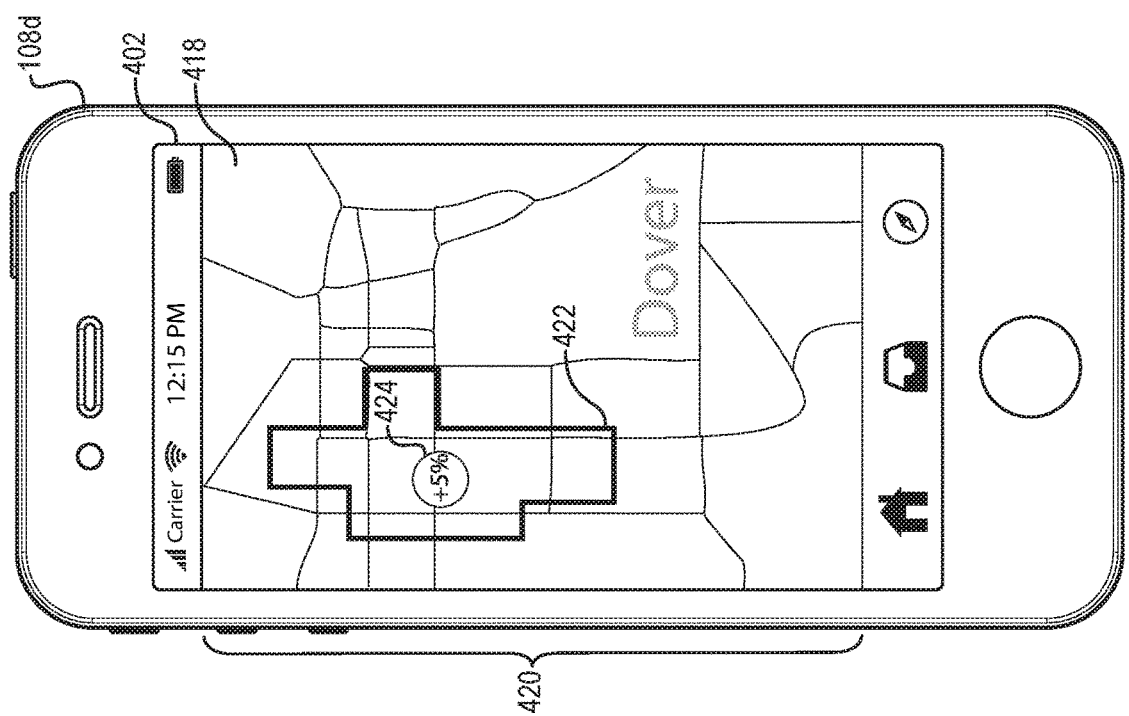

As mentioned above, the transportation matching system 202 predicts gaps and optimizes incentives in order to trigger the additional transportation provider activity necessary to cover the predicted gaps between predicted request activity and predicted transportation provider activity. In order to effectively communicate the optimized incentives to one or more provider computing devices, the transportation matching system 202 generates a schedule for the one or more provider computing devices detailing where and when the provider computing devices should be in order to earn the optimized incentive. FIGS. 4A-4C illustrate a series of graphical user interfaces (GUIs) by which the transportation matching system 202 provides the generated schedule to the one or more provider computing devices. For example, as shown in FIG. 4A, the transportation matching system 202 provides the dashboard GUI 404 on a touch screen display 402 of the provider computing device 108a. In one or more embodiments, the transportation matching system 202 and the transportation matching system 202 provide one or more GUIs via a transportation matching system application installed on the provider computing device 108a.

As illustrated in FIG. 4A, the dashboard GUI 404 includes a menu 406 of menu items 408a, 408b, 408c, 408d, and 408e. In response to detecting an interaction with one or more of the menu items 408a-408e, the transportation matching system 202 displays various GUIs including a variety of interactive features. For example, in response to a detected interaction with the menu item 408b, the transportation matching system 202 can provide a GUI listing a history of activity associated with the provider computing device 108a. Similarly, in response to a detected interaction with the menu items 408c, 408d, or 408e, the transportation matching system 202 can provide additional GUIs including provider information, vehicle information, or tutorials, respectively.

In response to a detected interaction (e.g., a tap touch gesture) with the menu item 408a, the transportation matching system 202 can provide the schedule GUI 410 on the touch screen display 402 of the provider computing device 108a, as shown in FIG. 4B. As further illustrated in FIG. 4B, the schedule GUI 410 includes a schedule 412 of selectable offers 414a, 414b, 414c, and 414d. In one or more embodiments, each selectable offer 414a-414d includes schedule information associated with one or more predicted gaps and the optimized incentives that correspond to each predicted gap. For example, the selectable offer 414a includes schedule information (e.g., "Tue, June 13," "2 pm-3 pm") that instructs the provider computing device 108a when to give provider hours in order to earn the optimized incentive associated with the selectable offer 414a (e.g., "+5%"). The schedule GUI 410 also includes an earned bonus listing 416 that details a bonus amount (e.g., "$145 Bonus") earned by the provider computing device 108a via one or more optimized incentives in the last day, the last week, or the month.

In one or more embodiments, the transportation matching system 202 offers optimized incentives associated with multiple geographic areas to a single provider computing device. For example, as shown in FIG. 4B, the selectable offer 414a may be associated with a different geographic area than the selectable offer 414b. In at least one embodiment, the transportation matching system 202 offers optimized incentives for more than one geographic area to the same provider computing device in response to analyzing activity information associated with the provider computing device indicating that the provider computing device gives provider hours in more than one geographic area.

In response to detecting a selection of any of the selectable offers 414a-414d, the transportation matching system 202 provides a map of the geographic area where the provider computing device 108a must give provider hours during the indicated period of time in order to earn the optimized incentive. For example, in response to detecting a selection (e.g. a tap touch gesture) of the selectable offer 414a, the transportation matching system 202 provides the interactive map GUI 418 on the touch screen display 402 of the provider computing device 108a, as shown in FIG. 4C.

As shown in FIG. 4C, the interactive map GUI 418 includes an interactive map showing a geographic area overlay 422 and the optimized incentive 424 corresponding to the geographic area within the geographic area overlay 422. In one or more embodiments, the geographic area overlay 422 indicates a geographic area within which the provider computing device 108a needs to be during the time indicated by the selectable offer 414a in order to earn the optimized incentive 424. In at least one embodiment, the transportation matching system 202 determines the size and shape of the geographic area overlay 422 by identifying GPS coordinates associated with the boundary of the corresponding geographic area and matching the geographical area overlay 422 to those coordinates. Additionally or alternatively, the transportation matching system 202 can determine the size and shape of the geographic area overlay 422 by identifying streets, sides of streets, and/or landmarks that outline the geographic area and matching the edges of the geographic area overlay 422 to those identified geographic features.

In one or more embodiments, the transportation matching system 202 provides the geographic area overlay 422 in connection with the interactive map GUI 418 in order to clearly and intuitively indicate to one or more providers the geographic area where a needed number of provider hours should be given in order to earn the optimized incentive 424. For example, in at least one embodiment, the interactive map GUI 418 can include an indicator of the current location of the provider computing device 108d relative to the geographic area overlay 422. Thus, the provider can quickly see if he or she is currently in the geographic area and earning the offered incentive. By providing this clear and intuitive display, the transportation matching system 202 maximizes the likelihood that the necessary number of provider hours will be provided in the geographic area represented by the geographic area overlay 422 in order to cover the predicted gap. Similarly, the geographic area overlay 422 minimizes the likelihood that providers will become confused as to where and when provider hours should be given in order to earn an offered incentive.

Figure 5:
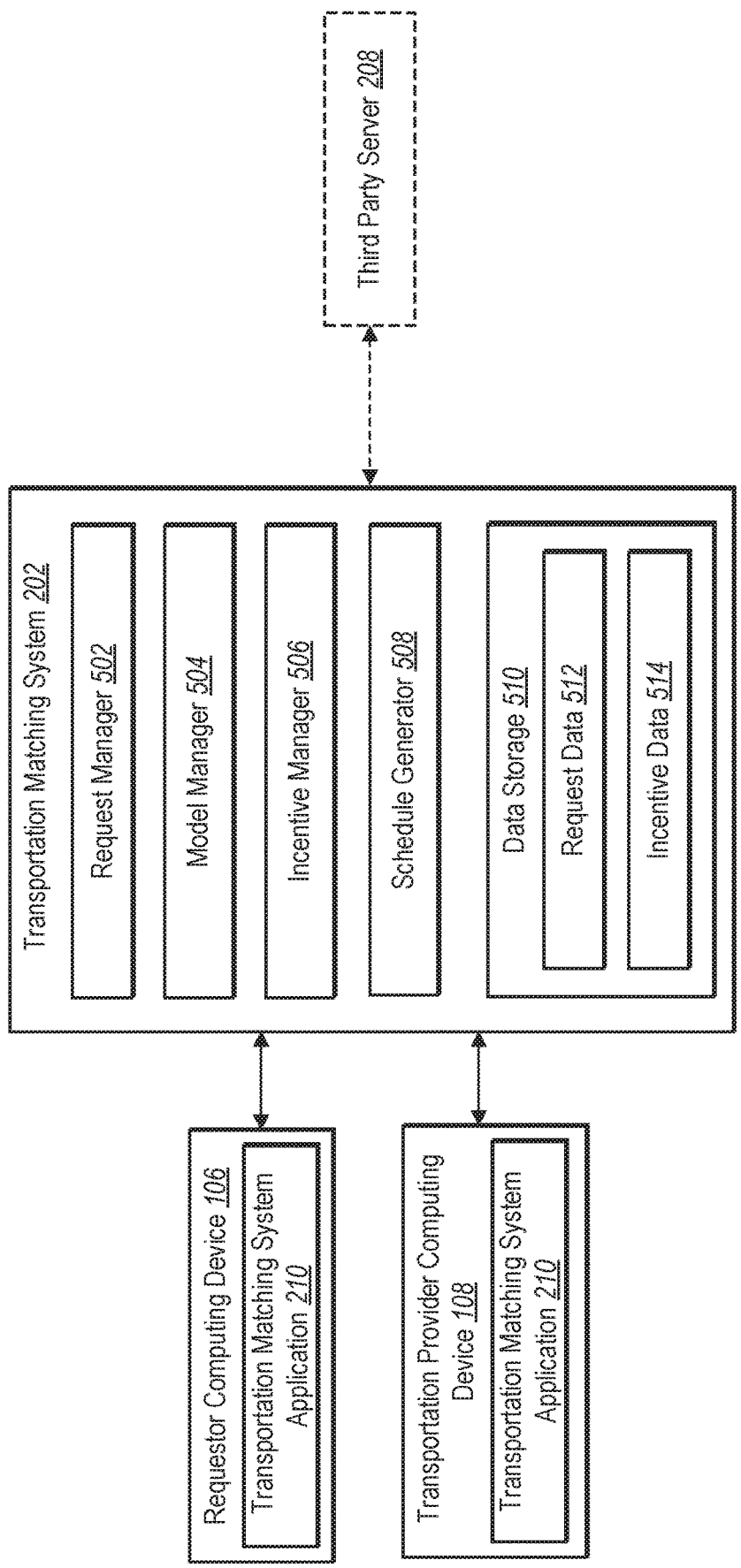
FIG. 5 illustrates a detailed schematic diagram of the transportation matching system in accordance with one or more embodiments.

FIG. 5 illustrates a schematic diagram illustrating an example embodiment of the transportation matching system 202 in connection with the requestor computing device 106 and the provider computing device 108. As shown in FIG. 5, the transportation matching system 202 includes various components for performing the processes and features described herein. For example, as shown in FIG. 5, the transportation matching system 202 includes request manager 502, model manager 504, incentive manager 506, schedule generator 508, and data storage 510 including request data 512 and incentive data 514. Additionally, the requestor computing device 106 and the provider computing device 108 each include the transportation matching system application 210. In one or more embodiments, the transportation matching system 202 is also in communication with one or more third party servers 208.

Each of the components 502-508 of the transportation matching system 202 and the components 502, and 510-514 of the transportation matching system 202 can be implemented using a computing device including at least one processor executing instructions that cause the performance of the processes described herein. In some embodiments, the components 502-514 of the transportation matching system 202 can be implemented by a single server or across multiple servers. Additionally or alternatively, a combination of one or more server devices and one or more computing devices can implement the components described herein in a different arrangement than illustrated in FIG. 5. Additionally or alternatively, the components described herein can comprise a combination of computer-executable instructions and hardware.

In one or more embodiments, the transportation matching system application 210 is a native application installed on the requestor computing device 106 and on the provider computing device 108, respectively. For example, the transportation matching system application 210 can be a mobile application that installs and runs on a mobile device, such as a smart phone, tablet computer, or smart wearable. Alternatively, the transportation matching system application 210 can be a desktop application, widget, or other form of a native computer program. Furthermore, the transportation matching system application 210 may be a remote application accessed by the requestor computing device 106 or provider computing device 108. For example, the transportation matching system application 210 may be a web application that is executed within a web browser of the requestor computing device 106 or provider computing device 108.

In one or more embodiments, the transportation matching system application 210 enables a requestor or provider to interact with one or more features of the transportation matching system 202. For example, in order to provide the transportation matching system 202 with information upon which to match a request, the transportation matching system application 210 installed on the requestor computing device 106 includes features that enable a requestor to input request information. Further, in order to accurately match a received request to an appropriate provider computing device, the transportation matching system application 210 installed on the provider computing device 108 includes features that enable a provider to accept or reject a matched request.

Furthermore, the transportation matching system application 210 monitors other activity associated with the requestor computing device 106 and with the provider computing device 108. For example, the transportation matching system application 210 monitors GPS information associated with the requestor computing device 106 and with the provider computing device 108 in order to determine the exact locations of both devices. In one or more embodiments, the transportation matching system application 210 provides this additional monitored activity information to the transportation matching system 202.

Additionally, the transportation matching system application 210 generates and sends requests to the transportation matching system 202. As described above, in response to one or more detected user interactions with a display of the requestor computing device 110, the transportation matching system application 210 can generate a request for a provider to come to the current or future location of the requestor computing device 106 in order to provide transport to a specified destination. Accordingly, in response to detecting one or more user interactions, the transportation matching system application 210 generates a request. In one or more embodiments, the transportation matching system application 210 generates the request as a system call with the specific request information as parameters. Alternatively, the transportation matching system application 210 can generate the request, including the specific request information, as an electronic message, as metadata, or as a text file. After generating the request, the transportation matching system application 210 sends the request to the transportation matching system 202.

In one or more embodiments, the transportation matching system application 210 also receives information from the transportation matching system 202. For example, the transportation matching system application 210 on the provider computing device 108 can receive a generated schedule with optimized incentives from the transportation matching system 202. Further, in response to sending a generated request to the transportation matching system 202, the transportation matching system application 210 on the requestor computing device 106 can receive updates on the request matching process (e.g., "We're finding you a ride"), as well as updates on the proximity of the match (e.g., "Your driver is 2 minutes away").

As shown in FIG. 5, the requestor computing device 106 and the provider computing device 108 are communicatively linked with the transportation matching system 202. In one or more embodiments, the transportation matching system 202 predicts gaps in needed provider hours and generates schedules with optimized incentives in order to fill those predicted gaps. Furthermore, in response to receiving a request from the requestor computing device 106, the transportation matching system 202 matches the request to the best available provider computing device 108 and facilitates the fulfillment of the request as well as the payment of the provider.

As further illustrated in FIG. 5, and as mentioned above, the transportation matching system 202 includes the request manager 502. In one or more embodiments, the request manager 502 receives requests from requestor computing devices and matches each request to a suitable provider computing device. The request manager 502 further receives confirmation and location updates from the provider computing device 108 and communicates these updates to the requestor computing device 106. Upon determining a request has been fulfilled by the provider computing device 108, the request manager 502 debits a payment account associated with the requestor computing device 106 and provides a payment to the account associated with the provider computing device 108.

In addition to matching requests, the request manager 502 also tracks request and provider activity over time in order to predict gaps in provider hours. For example, as discussed above, a gap in provider availability occurs when there are more requests in a given geographic area in a given window of time (e.g., Monday from 8 am to 9 am) than available provider hours that can be matched to the received requests. In order to identify a predicted gap associated with a given geographic area (e.g., the area within a zip code, the area within a geographic area such as an acre, a predefined area within specific preexisting streets), the request manager 502 first tracks request activity associated with the geographic area. For example, the request manager 502 tracks request activity information including, but not limited to, a number of received requests, an amount of time each requestor waits in-between submitting a request and being picked up, and destinations associated with each request. Further the request manager 502 tracks providing activity information including, but not limited to, where a provider computing device 108 was located when it was matched to a received request, a time between when the provider computing device 108 received a request and when the requested pickup occurred, how long it took to fulfill the request, and how long the provider computing device 108 idled prior to receiving the request.

From this tracked information, the request manager 502 predicts an average number of expected request hours for the geographic area on a given day and time. For example, in one or more embodiments, the request manager 502 predicts the average number of expected request hours by converting the tracked requesting activity to a number of hours that represents the amount of time the transportation matching system 202 can expect to provide to one or more requestor computing devices in order to meet the requests submitted by the one or more requestor computing devices. Similarly, the request manager 502 utilizes the tracked provider activity information to predict an average number of provider hours that will be given in the geographic area on the given day and time. In one or more embodiments, the request manager 502 calculates the average number of provider hours given during the day and time within the geographic area by averaging the amount of time providers spend providing transportation during that window, based on the tracked information.

After calculating a predicted number of request hours and the predicted number of provider hours, the request manager 502 identifies the predicted gap for the geographic area during the day and time. For example, the request manager 502 identifies the predicted gap by calculating the difference between the predicted request hours and the predicted number of provider hours. As discussed above, the predicted gap represents an average number of provider hours that will be needed for a given day and time in and geographic area above the expected number of provider hours that will likely be available during the predicted gap.

As discussed above, the request manager 502 predicts a gap for a geographic area during an hour of time on a given day. In one or more embodiments, the request manager 502 repeats the steps described above in order to predict a gap for the geographic area for every hour in a week (e.g., for each of the one hundred and sixty eight hours in a week). In at least one embodiment, rather than predicting one hundred and sixty eight gaps for a given geographic area, the request manager 502 can group certain hours together and predict a gap for each group of hours. For example, the request manager 502 can group together: morning commute hours (e.g., 7 am-9:30 am), evening commute hours (e.g., 4:30 pm-7 pm), and weekend hours (e.g., Saturday at 1 am-Sunday at 12 am. The request manager 502 can then predict a gap for each group of hours.

In additional embodiments, the request manager 502 can predict a gap associated with other increments of time. For example, the request manager 502 can predict a gap associated with portions of a hour (e.g., thirty minute increments). In that embodiment, the request manager 502 can predict as many as forty eight gaps in a single day. Additionally or alternatively, the request manager 502 can identify gaps associated with a range of time increments across a single day. For example, the request manager 502 can identify gaps every thirty minutes during periods of high requestor activity in a geographic area on a particular day, and then can identify gaps associated with two hour time increments during period of low requestor activity in the same day. Additionally or alternatively, the request manager 502 can identify gaps associated with multiple hours grouped together (e.g., "rush hour" can include weekdays from 7 am to 9 am, "brunch" can include Sunday from 10 am to 12 pm, "commute hours" can include week nights from 4:30 pm to 7 pm).

As mentioned above, and as shown in FIG. 5, the transportation matching system 202 includes the model manager 504. In one or more embodiments, the model manager 504 trains and utilizes a predictive request model to optimize incentives to fill the gaps predicted by the request manager 502, generates cost curves based on the optimized incentives, and generates provider schedules to communicate the optimized incentives to one or more provider computing devices.

In one or more embodiments, the model manager 504 generates predictive request model training data by exploring the effects of providing a variety incentives to providers during a predicted gap. For example, in response to an upcoming predicted gap, the model manager 504 can provide a 20% bonus incentive to one or more provider computing devices. The model manager 504 then determines if providing the 20% bonus incentive resulted in the optimal number of provider hours being provided during the gap. If the optimal number of provider hours are not provided, the model manager 504 then provides increasing amounts of bonus incentives to the one or more provider computing devices until the optimal number of provider hours are provided. This experiment may take place over several occurrences of the predicted gap.

As mentioned above, in one or more embodiments, the model manager 504 provides a variety of incentive types to provider computing devices. For each incentive provided while experimenting on the effects of providing a variety of incentives to providers during a predicted gap, the model manager 504 generates predictive request model training data. For example, for an incentive provided during the experiment phase, the model manager 504 generates an input vector that includes the parameters of the predicted gap (e.g., the geographic area, the day, and the time associated with the gap), and the incentive that was offered to the one or more provider computing devices. Additionally, in at least one embodiment, the input vector can include information specific to each provider computing device that was offered the incentive. For example, the information specific to each provider computing device can include an activity history associated with the provider computing device (e.g., when and where provider hours have been given, where pickups have occurred, a geographic area encompassing where transportation has been provided), and other personal demographics associated with the provider computing device (e.g., music preferences, transportation distance preferences, the age of the provider, the number of hours the provider spends on-duty, the home address associated with the provider, additional languages spoken by the provider). Further, for the incentive provided during this experiment phase, the model manager 504 generates a training output that indicates whether the provider computing device that received the incentive was available during the gap to receive requests. The model manager 504 then trains the predictive request model (e.g., a convolutional neural network trained via feed-forward back-propagation training) with the generated training data (e.g., input vectors and outputs).

In at least one embodiment, the model manager 504 generates training data with increasing levels of specificity. For example, the model manager 504 initially trains the predictive request model to optimize incentives for the average provider computing device. Over time, the model manager 504 generates input vectors that include more specific types of data associated with each provider computing device included in the exploration phase such that the trained predictive request model eventually optimizes incentives for specific provider computing devices. For example, the model manager 504 can generate more specific input vectors including data such as, but not limited to, provider demographic information, provider activity history, and provider preferences.

After training the predictive request model, the model manager 504 enters an exploitation phase and utilizes the trained predictive request model. For example, in response to determining that a predict gap will occur within a threshold amount of time (e.g., within the next week), the model manager 504 utilizes the trained predictive request model to optimize an incentive for one or more provider computing devices. As discussed above, the model manager 504 trains the predictive request model to generate an incentive metric representing the optimized incentive for triggering additional provider activity for a given geographic area and time period.

In one or more embodiments, the model manager 504 exploits the predictive request model by generating input vectors associated with an upcoming predicted gap. For example, the model manager 504 generates an input vector including the parameters of the upcoming predicted gap (e.g., the geographic area, the day, and the time), and the number of provider hours that are needed to cover the upcoming predicted gap. In response to receiving the generated input vector, the trained predictive request model outputs an incentive metric. In additional embodiments, the model manager 504 also includes budget information in the generated input vector. In that embodiment, the trained predictive request model outputs an optimized incentive within the limits of the budget outlined in the budgeted information.

In at least one embodiment, the model manager 504 balances the experimenting phase with the exploitation phase in order to keep the predictive request model up to date over time. For example, predicted gaps can change over time because of seasonal changes. For instance, a predicted gap may change because transportation services are typically more expensive in bad weather, or during winter in areas that experience heavy snowfall.

In another example, a predicted gap may change due to events that cannot be accounted for with historical data. For example, third party data may indicate that a new convention is coming to a geographic area, or that there has been an unexpected break-down in public transit in the geographic area. Because these events are new or unexpected, the model manager 504 has no historical data upon which to base an accurate prediction. Without the third party data upon which to update a predicted gap for the geographic area, the model manager 504 would fail to predict hundreds or even thousands of additional requests due to these events. Accordingly, by utilizing the third party data (e.g., from the third party server 208) the model manager 504 can accurately account for increases in requestor activity that have no historical precedent for a particular geographic area. Accordingly, the model manager 504 can periodically initiate experiments to gather new training data while still utilizing the output of the predictive request model. For instance, in one embodiment, the model manager 504 may determine to offer an optimized incentive to 50% of provider computing devices for an upcoming predicted gap, while experimenting with randomized incentives offered to the remaining 50% of provider computing devices.

In at least one embodiment, the model manager 504 includes real-time tracking capabilities that enable the model manager 504 to compare the amount of provider activity being triggered by the predictive request model against current requestor activity in a given geographic area. For example, the model manager 504 can utilize these capabilities to determine that the current requestor activity is not being met by the incentivized provider computing devices in the geographic area. In response to this determination, the model manager 504 can increase the incentive metrics indicated by the predictive request model in order to trigger additional transportation provider activity in the geographic area.

As shown in FIG. 5, and as mentioned above, the transportation matching system 202 also includes an incentive manager 506. In one or more embodiments, the incentive manager 506 utilizes the output of the predictive request model to build a cost curve that illustrates how much the transportation matching system 202 can expect to pay for a given number of provider hours during a particular hour within the geographic area. In some embodiments, the incentive manager 506 generates an incentive curve associated with the geographic area that includes a point plotted at an x-coordinate corresponding to the number of provider hours needed to cover a predicted gap for a particular area and time period, and at a y-coordinate corresponding to the total cost required to produce that number of provider hours from one or more provider computing devices. For example, in one embodiment, the total cost required to incentivize that number of provider hours equals the value of the optimized incentive multiplied by the needed number of provider hours. Alternatively, the total cost required to incentivize that number of provider hours can equal the value of the optimized incentive added to the average cost of a provider hour, multiplied by the needed number of provider hours. In one or more embodiments, as different numbers of provider hours are needed to cover predicted gaps associated with the geographic area, the geographic area's cost curve should eventually resemble exponential growth.

As shown in FIG. 5, the transportation matching system 202 also includes the schedule generator 508. As discussed above, the trained predictive request model optimizes incentives for identified gaps across all 168 hours, or other time increment, in a week for a given geographic area. Accordingly, in one or more embodiments the schedule generator 508 generates a weekly schedule that includes the optimized incentives for an upcoming week.

In one or more embodiments, the schedule generator 508 generates a customized schedule that includes a listing of one or more optimized incentives as well as instructions on where and when a provider computing device needs to give provider hours in order to earn each optimized incentive. For example, if an upcoming week for a given geographic area includes four predicted gaps, the schedule generator 508 generates a schedule that includes a listing of the geographic area, the days, and the times that define each gap, as well as the optimized incentive for each predicted gap. The schedule generator 508 can then provide the generated schedule to the one or more provider computing devices.

In one or more embodiments, the schedule generator 508 generates the customized schedule by determining one or more geographic areas where a particular provider computing device can give provider hours. For example, a provider computing device based on San Francisco is unlikely to give provider hours in New York City, but may give provider hours within multiple geographic areas in San Francisco and surrounding cities. Accordingly, the schedule generator 508 can determine where a provider computing device will likely give provider hours by analyzing an activity history associated with the provider computing device to identify geographic areas where the provider computing device has given more than a threshold number of hours, and to identify other use patterns. Based on this analysis, the schedule generator 508 can customize a schedule for that provider computing device that includes optimized incentives associated with one or more geographic areas where the provider computing device will likely be willing to give provider hours.

In addition to generating a customized schedule for each provider computing device, the schedule generator 508 also generates an interactive map associated with each customized schedule. For example, the schedule generator 508 can determine the coordinates, streets, sides of streets, and landmarks that form the boundaries of a particular geographic area. In one or more embodiments, the schedule generator 508 then generates an interactive map (e.g., the interactive map GUI 418, shown in FIG. 4C) including an overlay illustrating the geographic area. In at least one embodiment, the interactive map also includes incentive information in order to give a clear display of where and when a provider needs to be present in order to earn an offered incentive.

As further shown in FIG. 5, the transportation matching system 202 also includes the data storage 510 including request data 512 and incentive data 514. In one or more embodiments, request data 512 includes request information such as described herein. Also in one or more embodiments, incentive data 514 includes incentive information, such as described herein.

Figure 6:
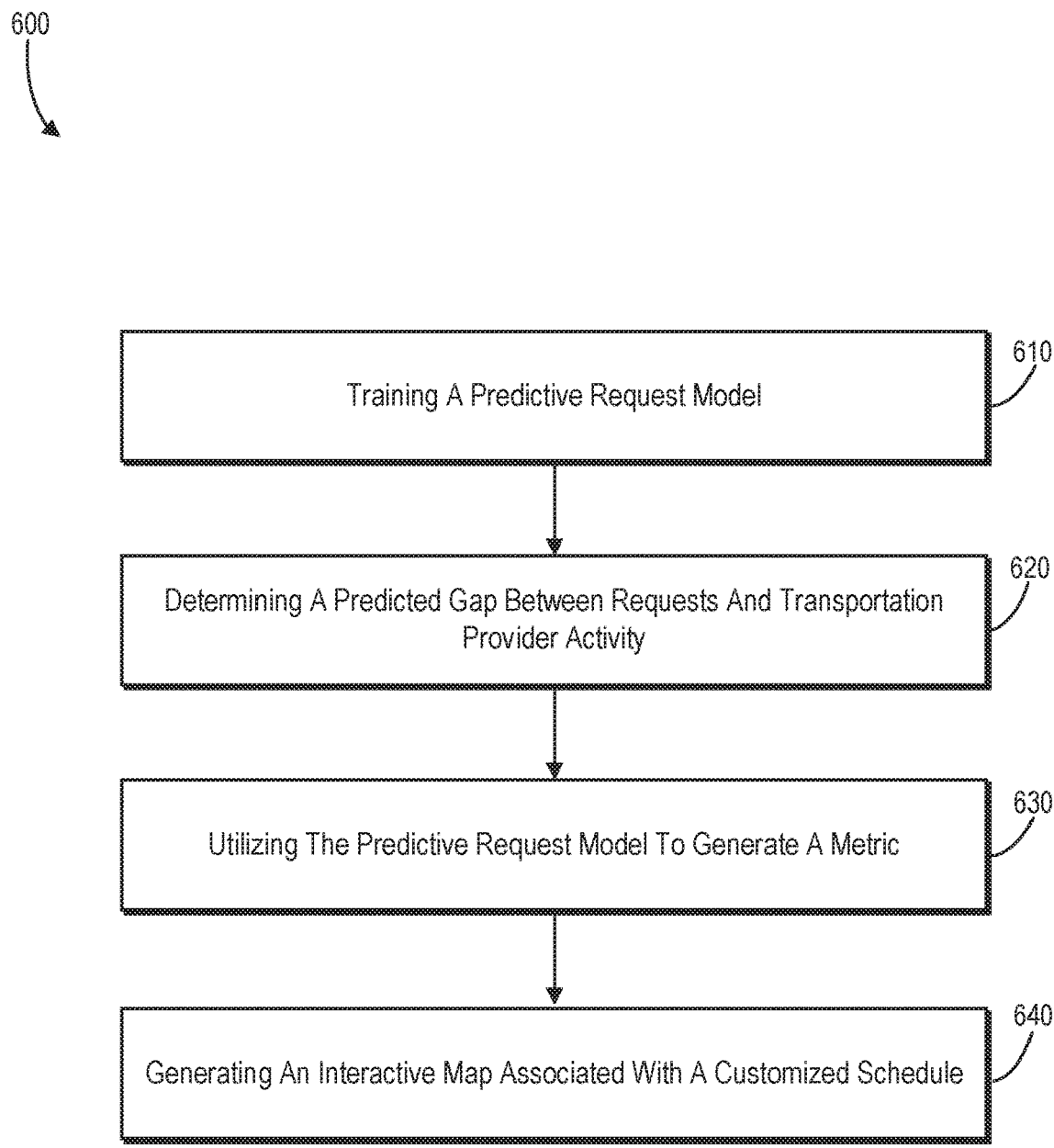
FIG. 6 illustrates a flowchart of a series of acts in a method of generating a customized provider schedule in accordance with one or more embodiments.

Turning now to FIG. 6, this figure illustrates a flowchart of a series of acts 600 of generating an interactive map associated with a customized schedule for one or more provider computing devices. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions, that when executed by one or more processors, cause a computing device to perform the acts of FIG. 6. In still further embodiments, a system can perform the acts of FIG. 6.

As shown in FIG. 6, the series of acts 600 includes an act 610 of training a predictive request model. For example, the act 610 can involve training, using a training dataset, a predictive request model to generate metrics predicted to trigger an increase in transportation provider activity within the geographic area for a given time period. For instance, training the predictive request model to generate metrics predicted to trigger an increase in transportation provider activity includes training the predictive request model to generate an incentive metric curve that correlates a cost to an amount of increased transportation provider activity.

In at least one embodiment, the series of acts 600 further includes an act of, prior to training the predictive request model, accessing the training dataset including historical information for past transportation provider activity within a geographic area. Additionally, in one or more embodiments, the series of acts 600 includes an act of tracking transportation requests and transportation provider activity for a plurality of geographic areas and for a plurality of past time periods, wherein accessing the training dataset including historical information includes accessing the tracked transportation requests and transportation provider activity for the plurality of geographic areas and for the plurality of past time periods.

Further, the series of acts 600 includes an act 620 of determining a predicted gap between requests and transportation provider activity. For example, the act 620 can involve determining a predicted gap between expected request activity and expected transportation provider activity for the geographic area during a future time period.

The series of acts 600 also includes an act 630 of utilizing the predictive request model to generate a metric. For example, the act 630 can involve utilizing the predictive request model and the predicted gap to generate a metric for the geographic area during the future time period. In one or more embodiments, wherein the metric is predicted to trigger an increase in transportation provider activity to satisfy the predicted gap. In at least one embodiment, utilizing the predictive request model and the predicted gap to generate the metric includes: generating a predictive request model input vector, the predictive request model input vector including: the geographic area, the future time period, and the predicted gap, and receiving, in response to providing the generated predictive request model input vector to the predictive request model, the generated metric from the predictive request model. In one or more embodiments, the series of acts 600 further includes an act of, in response to generating the metric, utilizing the generated metric to update an incentive metric curve associated with the geographic area.

In at least one embodiment, the series of acts 600 includes an act of detecting a deficit in the training dataset. The series of acts 600 can further include acts of initiating a data collection experiment by: randomizing a plurality of provider incentives for given geographic area and a given time period, and tracking results of the plurality of provider incentives. Additionally, the series of acts 600 can include an act of including the results in the training dataset.

Additionally, the series of acts 600 includes an act 640 of generating an interactive map associated with a customized schedule. For example, the act 640 can involve generating an interactive map associated with a customized schedule for the geographic area and the future time period based on the generated metric. In one or more embodiments, generating the interactive map associated with the customized schedule includes indicating one or more boundaries of the geographic area in the interactive map, and providing an overlay in connection with the interactive map including customized schedule information for the future time period.

In one or more embodiments, the series of acts 600 includes an act of generating the customized schedule for the geographic area and the future time period, wherein generating the customized schedule includes identifying a plurality of target transportation provider computing devices associated with the geographic area, and generating the customized schedule for each of the identified plurality of target transportation provider computing devices. In at least one embodiment, the series of acts 600 includes analyzing transportation provider activity to identify travel patterns across one or more geographic areas during one or more periods of time, wherein identifying the plurality of target transportation provider computing devices associated with the geographic area includes identifying one or more transportation provider computing devices associated with travel patterns including the geographic area during a time period having one or more similarities to the future time period. Additionally, the series of acts 600 can include an act of providing the customized schedule to the identified plurality transportation provider computing devices a threshold amount of time prior to the future time period.

Figure 7:
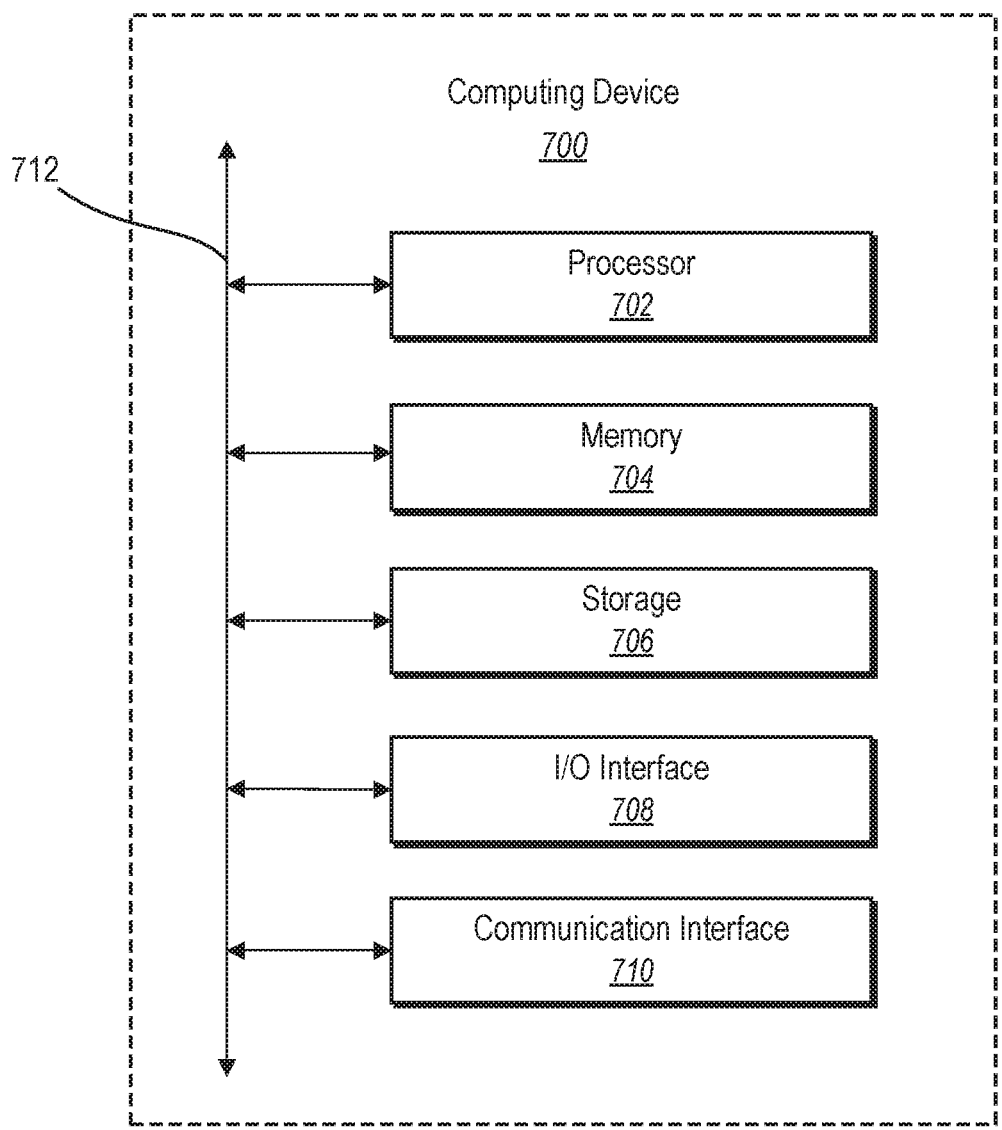
FIG. 7 illustrates a block diagram of an exemplary computing device in accordance with one or more embodiments.

FIG. 7 shows an example computer system 700, in accordance with various embodiments. In one or more embodiments, the computer system 700 may be used to implement any of the systems, devices, or methods described herein. In some embodiments, the computing system 700 may correspond to any of the various devices described herein, including, but not limited to, mobile devices, tablet computing devices, wearable devices, personal or laptop computers, vehicle-based computing devices, or other devices or systems described herein. As shown in FIG. 7, the computer system 700 can include various subsystems connected by a bus 702. The subsystems may include an I/O device subsystem 704, a display device subsystem 706, and a storage subsystem 710 including one or more computer readable storage media 708. The subsystems may also include a memory subsystem 712, a communication subsystem 720, and a processing subsystem 722.

In the computing system 700, the bus 702 facilitates communication between the various subsystems. Although a single bus 702 is shown, alternative bus configurations may also be used. The bus 702 may include any bus or other component to facilitate such communication as is known to one of ordinary skill in the art. Examples of such bus systems may include a local bus, parallel bus, serial bus, bus network, and/or multiple bus systems coordinated by a bus controller. The bus 702 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, the I/O device subsystem 704 may include various input and/or output devices or interfaces for communication with such devices. Such devices may include, without limitation, a touch screen display or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. The I/O device subsystem 704 may also include identification or authentication devices, such as fingerprint scanners, voiceprint scanners, iris scanners, or other biometric sensors or detectors. In various embodiments, the I/O device subsystem 704 may include audio output devices, such as speakers, media players, or other output devices.

The computer system 700 may include a display device subsystem 706. The display device subsystem 706 may include one or more lights, such as one or more light emitting diodes (LEDs), LED arrays, a liquid crystal display (LCD) or plasma display or other flat-screen display, a touch screen, a head-mounted display or other wearable display device, a projections device, a cathode ray tube (CRT), and any other display technology configured to visually convey information. In various embodiments, the display device subsystem 706 may include a controller and/or interface for controlling and/or communicating with an external display, such as any of the above-mentioned display technologies.

As shown in FIG. 7, the computer system 700 may include the storage subsystem 710 including various computer readable storage media 708, such as hard disk drives, solid state drives (including RAM-based and/or flash-based SSDs), or other storage devices. In one or more embodiments, the computer readable storage media 708 is configurable to store software, including programs, code, or other instructions, that is executable by a processor to provide functionality described herein. In some embodiments, the storage subsystem 710 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, the storage subsystem 710 can include a media reader, card reader, or other storage interface to communicate with one or more external and/or removable storage devices. In various embodiments, the computer readable storage media 708 can include any appropriate storage medium or combination of storage media. For example, the computer readable storage media 708 can include, but is not limited to, any one or more of random access memory (RAM), read only memory (ROM), electronically erasable programmable ROM (EEPROM), flash memory or other memory technology, optical storage (e.g., CD-ROM, DVD, Blu-ray® disk or other optical storage device), magnetic storage (e.g., tape drives, cassettes, magnetic disk storage or other magnetic storage devices). In some embodiments, the computer readable storage media 708 can include data signals or any other medium through which data can be sent and/or received.

The memory subsystem 712 can include various types of memory, including RAM, ROM, flash memory, or other memory. The memory subsystem 712 can include SRAM (static RAM) or DRAM (dynamic RAM). In some embodiments, the memory subsystem 712 can include a BIOS (basic input/output system) or other firmware configured to manage initialization of various components during for example startup. As shown in FIG. 7, the memory subsystem 712 can include applications 714 and application data 716. The applications 714 may include programs, code, or other instructions, that can be executed by a processor. The applications 714 can include various applications such as browser clients, location management applications, ride management applications, data management application, and any other application. The application data 716 can include any data produced and/or consumed by the applications 714. The memory subsystem 712 can additionally include operating system 718, such as macOS®, Windows®, Linux®, various UNIX® or UNIX- or Linux-based operating systems or other operating systems.

The computer system 700 can also include a communication subsystem 720 configured to facilitate communication between the computer system 700 and various external computer systems and/or networks (such as the Internet, a LAN, a WAN, a mobile network, or any other network). The communication subsystem 720 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally or alternatively, the communication subsystem 720 can include hardware and/or software components to communicate with satellite-based or ground-based location services, such as GPS (global positioning system). In some embodiments, the communication subsystem 720 may include, or interface with, various hardware or software sensors. The sensors may be configured to provide continuous and/or periodic data or data streams to a computer system through the communication subsystem 720.

As shown in FIG. 7, the processing subsystem 722 can include one or more processors or other devices operable to control the computing system 700. Such processors can include the single core processors 724, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing subsystem 722, such as processors 724 and 726, may be used independently or in combination depending on the application.

Figure 8:
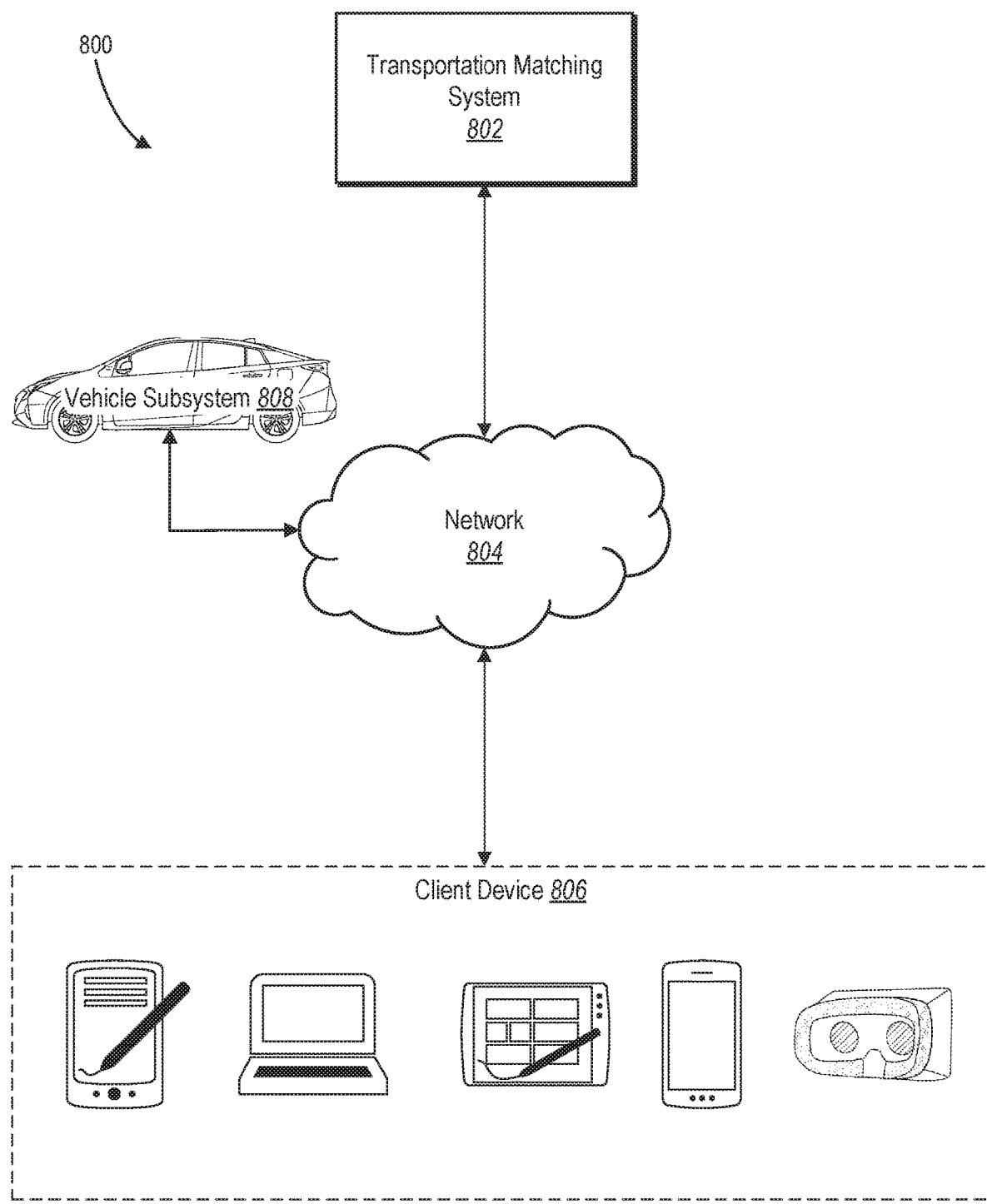
FIG. 8 illustrates an example network environment of a transportation matching system in accordance with one or more embodiments.

FIG. 8 illustrates an example network environment 800 of a transportation service system (e.g., the transportation matching system 112). The network environment 800 includes a client system 806, a transportation matching system 802, and a vehicle subsystem 808 connected to each other by a network 804. Although FIG. 8 illustrates a particular arrangement of the client system 806, the transportation matching system 802, the vehicle subsystem 808, and the network 804, this disclosure contemplates any suitable arrangement of the client system 806, the transportation matching system 802, the vehicle subsystem 808, and the network 804. As an example, and not by way of limitation, two or more of the client system 806, the transportation matching system 802, and the vehicle subsystem 808 communicate directly, bypassing the network 804. As another example, two or more of the client system 806, the transportation matching system 802, and the vehicle subsystem 808 may be physically or logically co-located with each other in whole or in part. Moreover, although FIG. 8 illustrates a particular number of the client systems 806, the transportation matching systems 802, the vehicle subsystems 808, and the networks 804, this disclosure contemplates any suitable number of the client systems 806, the transportation matching systems 802, the vehicle subsystems 808, and the networks 804. As an example, and not by way of limitation, the network environment 800 may include multiple client system 806, the transportation matching systems 802, the vehicle subsystems 808, and the networks 804.

This disclosure contemplates any suitable network 804. As an example, and not by way of limitation, one or more portions of the network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 804 may include one or more networks 804.

Links may connect the client system 806, the transportation matching system 802, and the vehicle subsystem 808 to the communication network 804 or to each other. This disclosure contemplates any suitable links. In particular embodiments, one or more links include one or more wireline (such as for example Digital Subscriber Line (DSL) or Data Over Cable Service Interface Specification (DOC SIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 800. One or more first links may differ in one or more respects from one or more second links.

In particular embodiments, the client system 806 may be an electronic device including hardware, software, or embedded logic components or a combination of two or more such components and capable of carrying out the appropriate functionalities implemented or supported by the client system 806. As an example, and not by way of limitation, a client system 806 may include any of the computing devices discussed above in relation to FIG. 7. A client system 806 may enable a network user at the client system 806 to access a network. A client system 806 may enable its user to communicate with other users at other client systems 806.

In particular embodiments, the client system 806 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client system 806 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 806 one or more Hyper Text Markup Language (HTML) files responsive to the HTTP request. The client system 806 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 802 may be a network-addressable computing system that can host a ride share transportation network. The transportation matching system 802 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 802. In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation matching system 802 may manage ride matching services to connect a user/requester with a vehicle and/or provider. By managing the ride matching services, the transportation matching system 802 can manage the distribution and allocation of vehicle subsystem resources and user resources such as GPS location and availability indicators, as described herein.

The transportation matching system 802 may be accessed by the other components of the network environment 800 either directly or via network 804. In particular embodiments, the transportation matching system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 806, or a transportation matching system 802 to manage, retrieve, modify, add, or delete, the information stored in data store.

In particular embodiments, the transportation matching system 802 may provide users with the ability to take actions on various types of items or objects, supported by the transportation matching system 802. As an example, and not by way of limitation, the items and objects may include ride share networks to which users of the transportation matching system 802 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 802 or by an external system of a third-party system, which is separate from the transportation matching system 802 and coupled to the transportation matching system 802 via a network 804.

In particular embodiments, the transportation matching system 802 may be capable of linking a variety of entities. As an example, and not by way of limitation, the transportation matching system 802 may enable users to interact with each other or other entities, or to allow users to interact with these entities through an application programming interfaces (API) or other communication channels.

In particular embodiments, the transportation matching system 802 may include a variety of servers, sub-systems, programs, modules, logs, and data stores. In particular embodiments, the transportation matching system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 802 may also include suitable components such as network interfaces, security mechanisms, load balancers, failover servers, management-and-network-operations consoles, other suitable components, or any suitable combination thereof. In particular embodiments, the transportation matching system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 802 and one or more client systems 806. An action logger may be used to receive communications from a web server about a user's actions on or off the transportation matching system 802. In conjunction with the action log, a third-party-content-object log may be maintained of user exposures to third-party-content objects. A notification controller may provide information regarding content objects to a client system 806. Information may be pushed to a client system 806 as notifications, or information may be pulled from the client system 806 responsive to a request received from the client system 806. Authorization servers may be used to enforce one or more privacy settings of the users of the transportation matching system 802. A privacy setting of a user determines how particular information associated with a user can be shared. The authorization server may allow users to opt in to or opt out of having their actions logged by the transportation matching system 802 or shared with other systems, such as, for example, by setting appropriate privacy settings. Third-party-content-object stores may be used to store content objects received from third parties. Location stores may be used for storing location information received from the client systems 806 associated with users.

In addition, the vehicle subsystem 808 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 808 can include an autonomous vehicle—i.e., a vehicle that does not require a human operator. In these embodiments, the vehicle subsystem 808 can perform maneuvers, communicate, and otherwise function without the aid of a human provider, in accordance with available technology.

In particular embodiments, the vehicle subsystem 808 may include one or more sensors incorporated therein or associated thereto. For example, sensor(s) can be mounted on the top of the vehicle subsystem 808 or else can be located within the interior of the vehicle subsystem 808. In certain embodiments, the sensor(s) can be located in multiple areas at once—i.e., split up throughout the vehicle subsystem 808 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

In particular embodiments, the vehicle subsystem 808 may include a communication device capable of communicating with the client system 806 and/or the transportation matching system 802. For example, the vehicle subsystem 808 can include an on-board computing device communicatively linked to the network 804 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:
   determining, by a transportation matching system, a predicted gap between predicted requestor time and predicted provider time in a geographic area during a future time period;
   generating, by the transportation matching system, a provider incentive metric for the geographic area during the future time period from the predicted gap utilizing a predictive request model, wherein the predictive request model is trained to generate provider incentive metrics indicating provider incentives to increase transportation provider activity in a given geographic area for a given future time period from gap metrics; and
   generating an interactive map associated with a customized schedule comprising:
   a geographic area overlay outlining the geographic area within the interactive map, and
   the generated provider incentive metric for the future time period overlaid on the geographic area overlay.

2. The method as recited in claim 1, wherein the provider incentive metric is predicted to trigger an increase in transportation provider activity to satisfy the predicted gap.

3. The method as recited in claim 1, further comprising accessing a training dataset comprising historical information for past transportation provider activity within a geographic area for training the predictive request model.

4. The method as recited in claim 3, further comprising:
   tracking transportation requests and transportation provider activity for a plurality of geographic areas and for a plurality of past time periods; and
   wherein accessing the training dataset comprising historical information comprises accessing the tracked transportation requests and transportation provider activity for the plurality of geographic areas and for the plurality of past time periods.

5. The method as recited in claim 1, further comprising training the predictive request model to generate provider incentive metrics predicted to trigger an increase in transportation provider activity by training the predictive request model to generate an incentive metric curve that correlates a cost to an amount of increased transportation provider activity.

6. The method as recited in claim 5, wherein generating the provider incentive metric for the geographic area during the future time period from the predicted gap utilizing the predictive request model comprises:
generating a predictive request model input vector, the predictive request model input vector comprising: the geographic area, the future time period, and the predicted gap; and
receiving, in response to providing the generated predictive request model input vector to the predictive request model, the generated provider incentive metric from the predictive request model.

7. The method as recited in claim 6, further comprising, in response to generating the provider incentive metric, utilizing the generated provider incentive metric to update an incentive metric curve associated with the geographic area.

8. The method as recited in claim 7, further comprising:
detecting a deficit in a training dataset for training the predictive request model;
initiating a data collection experiment by:
randomizing a plurality of provider incentives for given geographic area and a given time period; and
tracking results of the plurality of provider incentives; and
including the results in the training dataset.

9. The method as recited in claim 1, wherein generating the interactive map associated with the customized schedule comprises:
providing an overlay in connection with the interactive map comprising customized schedule information for the future time period.

10. The method as recited in claim 1, further comprising generating the customized schedule for the geographic area and the future time period, wherein generating the customized schedule comprises:
identifying a plurality of target transportation provider computing devices associated with the geographic area; and
generating the customized schedule for each of the identified plurality of target transportation provider computing devices.

11. The method as recited in claim 10, further comprising:
analyzing transportation provider activity to identify travel patterns across one or more geographic areas during one or more periods of time; and
wherein identifying the plurality of target transportation provider computing devices associated with the geographic area comprises identifying one or more transportation provider computing devices associated with travel patterns including the geographic area during a time period having one or more similarities to the future time period.

12. The method as recited in claim 11, further comprising providing the customized schedule to the identified plurality of transportation provider computing devices a threshold amount of time prior to the future time period.

13. A computing device comprising:
at least one processor; and
at least one non-transitory computer-readable storage medium storing instructions thereon that, when executed by the at least one processor, cause the computing device to:
determine a predicted gap between predicted requestor time and predicted provider time in a geographic area during a future time period;
generate a provider incentive metric for the geographic area during the future time period from the predicted gap utilizing a predictive request model, wherein the predictive request model is trained to generate provider incentive metrics indicating provider incentives to increase transportation provider activity in a given geographic area for a given future time period from gap metrics; and
generate an interactive map associated with a customized schedule comprising:
a geographic area overlay outlining the geographic area within the interactive map, and
the generated provider incentive metric for the future time period overlaid on the geographic area overlay.

14. The computing device as recited in claim 13, further storing instructions thereon that, when executed by the at least one processor, cause the computing device to:
track transportation requests and transportation provider activity for a plurality of geographic areas and for a plurality of past time periods; and
wherein a training dataset for training the predictive request model comprises historical information comprising the tracked transportation requests and transportation provider activity for the plurality of geographic areas and for the plurality of past time periods.

15. The computing device as recited in claim 14, further storing instructions thereon that, when executed by the at least one processor, cause the computing device to train the predictive request model to generate provider incentive metrics predicted to trigger an increase in transportation provider activity by training the predictive request model to generate an incentive metric curve that correlates a cost to an amount of increased transportation provider activity.

16. The computing device as recited in claim 15, further storing instructions thereon that, when executed by the at least one processor, cause the computing device to generate the provider incentive metric from the predicted gap utilizing the predictive request model by:
generating a predictive request model input vector, the predictive request model input vector comprising: the geographic area, the future time period, and the predicted gap; and
receiving, in response to providing the generated predictive request model input vector to the predictive request model, the generated provider incentive metric from the predictive request model.

17. The computing device as recited in claim 16, further storing instructions thereon that, when executed by the at least one processor, cause the computing device to, in response to generating the provider incentive metric, utilize the generated provider incentive metric to update an incentive metric curve associated with the geographic area.

18. The computing device as recited in claim 17, further storing instructions thereon that, when executed by the at least one processor, cause the computing device to generate the customized schedule for the geographic area and the future time period, wherein generating the customized schedule comprises:

identifying a plurality of target transportation provider computing devices associated with the geographic area; and generating the customized schedule for each of the identified plurality of target transportation provider computing devices.

19. The computing device as recited in claim 18, further storing instructions thereon that, when executed by the at least one processor, cause the computing device to:

analyze transportation provider activity to identify travel patterns across one or more geographic areas during one or more periods of time; and wherein identifying the plurality of target transportation provider computing devices associated with the geographic area comprises identifying one or more transportation provider computing devices associated with travel patterns including the geographic area during a time period having one or more similarities to the future time period.

20. A non-transitory computer-readable medium storing instructions thereon that, when executed by at least one processor, cause a system to:

determine a predicted gap between expected request activity and expected transportation provider activity for a geographic area during a future time period;

utilize a predictive request model and the predicted gap to generate a provider incentive metric for the geographic area during the future time period, wherein the predictive request model is trained to generate provider incentive metrics indicating provider incentives to increase transportation provider activity in a given geographic area for a given future time period;

generate an interactive map associated with a customized schedule for the geographic area and the future time period based on the generated provider incentive metric;

detect a deficit in a training dataset for training the predictive request model;

initiate a data collection experiment by:
randomizing a plurality of provider incentives for the given geographic area and a given time period; and
tracking results of the plurality of provider incentives; and including the results in the training dataset.

\* \* \* \* \*